United States Patent
Dunbar et al.

(10) Patent No.: US 12,219,005 B2
(45) Date of Patent: Feb. 4, 2025

(54) NETWORK PROTOCOL EXTENSION FOR 5G EDGE COMPUTING SERVICES

(71) Applicant: Huawei Technologies Co., Ltd., Shenzhen (CN)

(72) Inventors: Linda Dunbar, Plano, TX (US); Huaimo Chen, Bolton, MA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/303,747

(22) Filed: Apr. 20, 2023

(65) Prior Publication Data

US 2023/0262112 A1 Aug. 17, 2023

Related U.S. Application Data

(63) Continuation of application No. PCT/US2021/056011, filed on Oct. 21, 2021.

(60) Provisional application No. 63/104,285, filed on Oct. 22, 2020.

(51) Int. Cl.
*H04L 67/1004* (2022.01)
*H04L 45/02* (2022.01)
*H04L 45/12* (2022.01)

(52) U.S. Cl.
CPC .......... *H04L 67/1004* (2013.01); *H04L 45/04* (2013.01); *H04L 45/124* (2013.01)

(58) Field of Classification Search
CPC ... H04L 67/1004; H04L 45/04; H04L 45/124; H04L 45/12; H04L 45/121; H04L 67/1001; H04L 45/125
See application file for complete search history.

(56) References Cited

U.S. PATENT DOCUMENTS

| | | | | |
|---|---|---|---|---|
| 6,687,731 | B1* | 2/2004 | Kavak | H04L 67/1036 718/105 |
| 2011/0040861 | A1* | 2/2011 | Van der Merwe | H04L 61/4511 709/245 |
| 2011/0154101 | A1* | 6/2011 | Merwe | G06F 11/3006 718/1 |
| 2022/0417147 | A1* | 12/2022 | Woodworth | H04L 45/08 |

OTHER PUBLICATIONS

Hao, et al., "QOS Routing for Anycast Communications: Motivation and an Architecture for DIFFSERV Networks," IEEE Communications Magazine, IEEE Service Center, Piscataway, US, vol. 40, No. 6, Jun. 1, 2002 (Jun. 1, 2002), pp. 48-56, XP001123511.
Yuan, et al., "A Future Anycast Routing Scheme for Information-Centric Network," Communications (APCC), 2012 18th Asia-Pacific Conference On, IEEE, Oct. 15, 2012 (Oct. 15, 2012), pp. 173-178, XP032278677.

* cited by examiner

*Primary Examiner* — Benjamin M Thieu
(74) *Attorney, Agent, or Firm* — Conley Rose, P.C.

(57) ABSTRACT

A method used by an egress router is disclosed. The egress router obtains a capacity index of an application server attached to the egress router. The egress router further obtains a load index describing a load measurement between the egress router and the application server during a certain time period. The egress router encodes the capacity index and the load index into a packet. The egress router transmits the packet to one or more routers in an Internet protocol (IP) network.

21 Claims, 9 Drawing Sheets

NETWORK PROTOCOL EXTENSION FOR 5G EDGE COMPUTING SERVICES

CROSS-REFERENCE TO RELATED APPLICATIONS

This patent application is a continuation of International Application No. PCT/US2021/056011 filed on Oct. 21, 2021, by Futurewei Technologies, Inc., and titled "Network Protocol Extension For 5G Edge Computing Services," which claims the benefit of U.S. Provisional Patent Application No. 63/104,285 filed Oct. 22, 2020 by Futurewei Technologies, Inc., and titled "Network Protocol Extension For 5G Edge Computing Services," which is hereby incorporated by reference.

TECHNICAL FIELD

The present disclosure is generally related to telecommunications, and is specifically related to an edge computing services.

BACKGROUND

Many modern mobile devices include equipment to support wireless Internet connections. For example, the mobile devices can communicate via interfaces that are standardized by the 3rd Generation Partnership Project (3GPP). The most recent iteration of the mobile network is known as fifth generation mobile network (5G). Mobile networks are configured to allow a mobile device to move between locations by allowing the mobile device to swap connections between mobile network towers. The mobile networks may be configured to support such mobility by employing instancing. For example, various application instances can be installed physically near the mobile network towers. When the mobile device moves, mobile device communications can be forwarded to the closest relevant application instance. One concern with this approach is that minor differences in distance can cause some application instances to be over-utilized, while other application instances that are slightly more distant may become under-utilized. This can occur due to normal device movements, such as when a large number of people bring mobile devices into a small geographic area, for example due to traffic congestion, attendance of events, movement to and from high density urban buildings, etc.

SUMMARY

In an embodiment, the disclosure includes a method implemented by an egress router, the method comprising: obtaining, by the egress router, a capacity index of an application server attached to the egress router; obtaining, by the egress router, a load index describing a load measurement between the egress router and the application server during a certain time period; encoding, by the egress router, the capacity index and load index into a packet; and transmitting, by the egress router, the packet to one or more routers in an Internet protocol (IP) network.

Edge computing application servers may employ instancing. For example, different data centers may each employ different copies (instances) of the same application server. In such a case, a UE receives the same service no matter which data center receives the UE's communications. One mechanism to implement such instancing is to configure all of the application server instances with the same anycast address. The UE can use the anycast address as a destination address in communications, and the network can use the anycast address to route the communication to whichever application server is closest. This is in contrast with an IP address that points to a specific machine on the Internet. When physical distance and/or fewest hops routing is used to determine the lowest cost application server, certain application servers can become overloaded. Meanwhile, other similar application servers with a slightly longer route may be very lightly used. This can create load imbalances in a network that can be difficult to solve by simply moving instances between application servers in different datacenters.

The present embodiment includes mechanisms to support load balancing for IP based edge computing services that route packets by employing anycast addresses. The 5G network is connected to an IP network by ingress routers. The IP network is connected to local data networks (LDNs) by egress routers. Application servers employing application instances are contained in the LDNs, for example in data centers. Further, the application servers may each be directly connected to a corresponding egress router. In the present example, the egress router maintains data indicating the capacity of the corresponding application server. For example, the egress router can be configured with a capacity index that indicates a capacity of the application server, which may indicate a number of packets the application server can process during the certain time period, for example a measurement period, advertisement period or a specified time period. Further, the egress router can measure a load index for the application server. The load index indicates a load measurement for the application server, which may indicate a number of packets and/or bytes sent to and received from the application server over the fixed time period of time. Since the application server is attached to the egress router, the load index can indicate the number of packet and/or bytes communicated between the egress router and the application server. The load index can be collected or measured by the egress router attached to the application server. The load index may be a weighted combination of the number of packet and/or bytes. In addition, the egress router can be configured with a preference index for the application server. The preference index may be a value that indicates a preference for the application server relative to other similar application servers. The capacity index, the load index, and/or the preference index can then be used to determine a routing cost associated with the application server. For example, the capacity index, the load index, and/or the preference index can be communicated across the IP network to the ingress routers for use in selecting a lowest cost application server associated with an anycast address. In another example, the capacity index, the load index, and/or the preference index can be aggregated at the egress router and transmitted across the network toward the ingress routers as a single value. In an example, the ingress router can determine the cost for the anycast traffic towards each application server. In an example, the ingress router can determine the routing cost by determining a network delay between the ingress router and the egress router. The ingress router can then compute the cost based on the network delay, the capacity index, the load index, and/or the preference index. The ingress router may select, based on costs to a plurality of application servers with a same anycast address, an application server from the plurality of application servers. The ingress router can then use the anycast address to route to the application server connected to the egress server with the lowest cost. By employing a more complex cost metric for routing, the anycast packets from the 5G network can be forwarded to the LDNs in the 5G edge computing network in a manner that supports effective load balancing. For example, the cost metric can ensure that under-utilized application servers receive anycast traffic even when closer over-utilized application servers are present. Further, the preference index can be used by network administrators to steer traffic to particular application servers as desired. Accordingly, the advertising mechanisms and corresponding cost metric address problems that are specific to the telecommunication arts.

Optionally, in any of the preceding aspects, another implementation of the aspect provides, further comprising: obtaining, by the egress router, a preference index of the application server, wherein the preference index contains a value that indicates a preference for the application server relative to other application servers sharing an anycast address; and encoding, by the egress router, the preference index into the packet.

Optionally, in any of the preceding aspects, another implementation of the aspect provides, wherein the capacity index is a numerical value indicating a number of packets the application server can process during the certain time period.

Optionally, in any of the preceding aspects, another implementation of the aspect provides, wherein the load index is obtained by measuring packets traversing the egress router during the certain time period.

Optionally, in any of the preceding aspects, another implementation of the aspect provides, wherein the packet is an open shortest path first (OSPF) link state advertisement (LSA), and wherein transmitting the packet includes broadcasting the OSPF LSA to routers attached to the IP network according to an OSPF protocol.

Optionally, in any of the preceding aspects, another implementation of the aspect provides, wherein the packet is an intermediate system to intermediate system (ISIS) link state packet (LSP) data unit, and wherein transmitting the packet includes broadcasting the ISIS LSP data unit to routers attached to the IP network according to an ISIS protocol.

Optionally, in any of the preceding aspects, another implementation of the aspect provides, wherein the packet is a border gateway protocol (BGP) update message.

Optionally, in any of the preceding aspects, another implementation of the aspect provides, wherein transmitting the packet includes transmitting the BGP update message to a route reflector for distribution to a group of edge routers connected to the IP network.

Optionally, in any of the preceding aspects, another implementation of the aspect provides, wherein encoding, by the egress router, the capacity index and load index into a packet comprises: computing by the egress router, a cost to the application server in according to the load index, the capacity index, and the preference index and encoding the cost to the application server into the packet, wherein the cost to the application server is computed according to:

$$\frac{\alpha L_j \beta_i}{L_i \beta_j} + \frac{(1-\alpha)D_j \gamma_i}{D_i \gamma_j}$$

where $L_i$ represents a load measurement for the site i, $L_j$ represents a load measurement for the site j, $\beta_i$ represents a capacity of an application server at the site i, $\beta_j$ represents a capacity of an application server at the site j, $D_i$ represents a network latency between a first ingress router and a first egress router attached to the application server at the site i, $D_j$ represents a network latency between a second ingress router and a second egress router attached to the application server at the site j, $\gamma_i$ represents a network preference for the site i, $\gamma_j$ represents a network preference for the site j, $\alpha$ represents a weighting factor for load and site information.

In an embodiment, the disclosure includes a method implemented by an ingress router, the method comprising: receiving, by the ingress router, a packet from an egress router via an Internet protocol (IP) network, the packet comprising: a capacity index of an application server attached to the egress router; and a load index describing a load measurement between the egress router and the application server during a certain time period; computing, by the ingress router, a cost to the application server based on the capacity index and the load index; and transmitting, by the ingress router, a flow of packets toward the egress router based on the cost.

Edge computing application servers may employ instancing. For example, different data centers may each employ different copies (instances) of the same application server. In such a case, a UE receives the same service no matter which data center receives the UE's communications. One mechanism to implement such instancing is to configure all of the application server instances with the same anycast address. The UE can use the anycast address as a destination address in communications, and the network can use the anycast address to route the communication to whichever application server is closest. This is in contrast with an IP address that points to a specific machine on the Internet. When physical distance and/or fewest hops routing is used to determine the lowest cost application server, certain application servers can become overloaded. Meanwhile, other similar application servers with a slightly longer route may be very lightly used. This can create load imbalances in a network that can be difficult to solve by simply moving instances between application servers in different datacenters.

The present embodiment includes mechanisms to support load balancing for IP based edge computing services that route packets by employing anycast addresses. The 5G network is connected to an IP network by ingress routers. The IP network is connected to local data networks (LDNs) by egress routers. Application servers employing application instances are contained in the LDNs, for example in data centers. Further, the application servers may each be directly connected to a corresponding egress router. In the present example, the egress router maintains data indicating the capacity of the corresponding application server. For example, the egress router can be configured with a capacity index that indicates a capacity of the application server, which may indicate a number of packets the application server can process during the certain time period, for example a measurement period, advertisement period or a specified time period. Further, the egress router can measure a load index for the application server. The load index indicates a load measurement for the application server, which may indicate a number of packets and/or bytes sent to and received from the application server over the fixed time period of time. Since the application server is attached to the egress router, the load index can indicate the number of packet and/or bytes communicated between the egress router and the application server. The load index can be collected or measured by the egress router attached to the application server. The load index may be a weighted combination of the number of packet and/or bytes. In addition, the egress router can be configured with a preference index for the application server. The preference index may be a value that indicates a preference for the application server relative to other similar application servers. The capacity index, the load index, and/or the preference index can then be used to determine a routing cost associated with the application server. For example, the capacity index, the load index, and/or the preference index can be communicated across the IP network to the ingress routers for use in selecting a lowest cost application server associated with an anycast address. In another example, the capacity index, the load index, and/or the preference index can be aggregated at the egress router and transmitted across the network toward the ingress routers as a single value. In an example, the ingress router can determine the cost for the anycast traffic towards each application server. In an example, the ingress router can determine the routing cost by determining a network delay between the ingress router and the egress router. The ingress router can then compute the cost based on the network delay, the capacity index, the load index, and/or the preference index. The ingress router may select, based on costs to a plurality of application servers with a same anycast address, an application server from the plurality of application servers. The ingress router can then use the anycast address to route to the application server connected to the egress server with the lowest cost. By employing a more complex cost metric for routing, the anycast packets from the 5G network can be forwarded to the LDNs in the 5G edge computing network in a manner that supports effective load balancing. For example, the cost metric can ensure that under-utilized application servers receive anycast traffic even when closer over-utilized application servers are present. Further, the preference index can be used by network administrators to steer traffic to particular application servers as desired. Accordingly, the advertising mechanisms and corresponding cost metric address problems that are specific to the telecommunication arts.

Optionally, in any of the preceding aspects, another implementation of the aspect provides, wherein the packet further comprises a preference index of the application server, wherein the preference index contains a value that indicates a preference for the application server relative to other application servers sharing an anycast address, and wherein the cost is further computed based on the preference index.

Optionally, in any of the preceding aspects, another implementation of the aspect provides, wherein the capacity index is a numerical value indicating a number of packets the application server can process during the certain time period.

Optionally, in any of the preceding aspects, another implementation of the aspect provides, wherein the packet is an open shortest path first (OSPF) link state advertisement (LSA), and wherein the packet is received as part of a broadcast of the OSPF LSA to routers attached to the IP network according to an OSPF protocol.

Optionally, in any of the preceding aspects, another implementation of the aspect provides, wherein the packet is an intermediate system to intermediate system (ISIS) link state packet data unit (LSP), and wherein the packet is received as part of a broadcast of the ISIS LSP to routers attached to the IP network according to an ISIS protocol.

Optionally, in any of the preceding aspects, another implementation of the aspect provides, wherein the packet is a border gateway protocol (BGP) update message.

Optionally, in any of the preceding aspects, another implementation of the aspect provides, wherein the packet is received from a route reflector as part of a distribution to a group of edge routers connected to the IP network.

Optionally, in any of the preceding aspects, another implementation of the aspect provides, wherein the cost to the application server is computed according to:

$$\frac{\alpha L_j \beta_i}{L_i \beta_j} + \frac{(1-\alpha)D_j \gamma_i}{D_i \gamma_j}$$

where $L_i$ represents a load measurement for the site i, $L_j$ represents a load measurement for the site j, $\beta_i$ represents a capacity of an application server at the site i, $\beta_j$ represents a capacity of an application server at the site j, $D_i$ represents a network latency between a first ingress router and a first egress router attached to the application server at the site i, $D_j$ represents a network latency between a second ingress router and a second egress router attached to the application server at the site j, $\gamma_i$ represents a network preference for the site i, $\gamma_j$ represents a network preference for the site j, $\alpha$ represents a weighting factor for load and site information.

In an embodiment, the disclosure includes a router comprising: a non-transitory memory storage comprising instructions; and one or more processors in communication with the non-transitory memory storage, wherein the one or more processors execute the instructions to perform the method of any of the preceding aspects.

In an embodiment, the disclosure includes a router comprising: a non-transitory memory storage comprising instructions; and one or more processors in communication with the non-transitory memory storage, wherein the one or more processors execute the instructions to perform the method of any of the preceding aspects.

In an embodiment, the disclosure includes a non-transitory computer readable medium comprising a computer program product for use by a router, the computer program product comprising computer executable instructions stored on the non-transitory computer readable medium such that when executed by a processor cause the router to perform the method of any of the preceding aspects.

In an embodiment, the disclosure includes a non-transitory computer readable medium comprising a computer program product for use by a router, the computer program product comprising computer executable instructions stored on the non-transitory computer readable medium such that when executed by a processor cause the router to perform the method of any of the preceding aspects.

In an embodiment, the disclosure includes an egress router comprising one or more means for performing the method of any of the preceding aspects.

In an embodiment, the disclosure includes an ingress router comprising one or more means for performing the method of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description.

DETAILED DESCRIPTION

Figure 1:
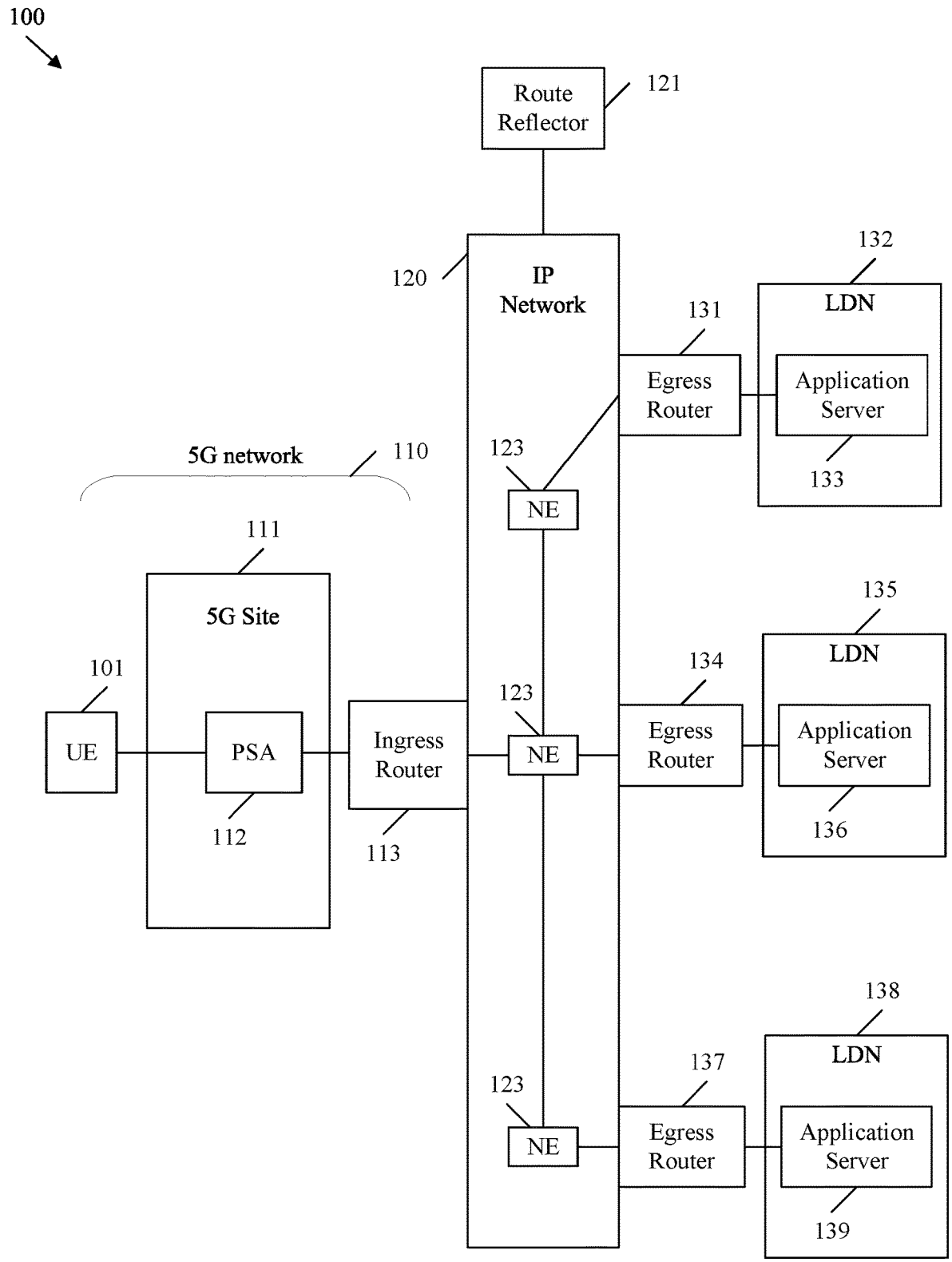
FIG. 1 is a schematic diagram of an example 5G edge computing network.

It should be understood at the outset that although an illustrative implementation of one or more embodiments are provided below, the disclosed systems and/or methods may be implemented using any number of techniques, whether currently known or yet to be developed. The disclosure should in no way be limited to the illustrative implementations, drawings, and techniques illustrated below, including the exemplary designs and implementations illustrated and described herein, but may be modified within the scope of the appended claims along with their full scope of equivalents.

A mobile device, or user equipment (UE), can take advantage of edge computing services. Specifically, the 5G network is connected to an Internet Protocol (IP) network, which is connected to various data centers. Edge computing involves connecting application servers in a data center directly coupled to the IP network. The goal of edge computing is to route communications from a UE connected to the 5G to the lowest cost application server via the IP network. Lowest cost may include a measurement of physical distance. By placing the application servers in close physical proximity to the 5G network, latency between the UE and the application server can be significantly reduced.

Edge computing application servers may employ instancing. For example, different data centers may each employ different copies (instances) of the same application server. In such a case, a UE receives the same service no matter which data center receives the UE's communications. One mechanism to implement such instancing is to configure all of the application server instances with the same anycast address. The UE can use the anycast address as a destination address in communications, and the network can use the anycast address to route the communication to whichever application server is closest. This is in contrast with an IP address that points to a specific machine on the Internet. When physical distance and/or fewest hops routing is used to determine the lowest cost application server, certain application servers can become overloaded. Meanwhile, other similar application servers with a slightly longer route may be very lightly used. This can create load imbalances in a network that can be difficult to solve by simply moving instances between application servers in different datacenters.

Disclosed herein are mechanisms to support load balancing for IP based edge computing services that route packets by employing anycast addresses. The 5G network is connected to an IP network by ingress routers. The IP network is connected to local data networks (LDNs) by egress routers. Application servers employing application instances are contained in the LDNs, for example in data centers. Further, the application servers may each be directly connected to a corresponding egress router. In the present example, the egress router maintains data indicating the capacity of the corresponding application server. For example, the egress router can be configured with a capacity index that indicates a capacity of the application server, which may indicate a number of packets the application server can process during the certain time period, for example a measurement period, advertisement period or a specified time period. Further, the egress router can measure a load index for the application server. The load index indicates a load measurement for the application server, which may indicate a number of packets and/or bytes sent to and received from the application server over the fixed time period of time. Since the application server is attached to the egress router, the load index can indicate the number of packet and/or bytes communicated between the egress router and the application server. The load index can be collected or measured by the egress router attached to the application server. The load index may be a weighted combination of the number of packet and/or bytes. In addition, the egress router can be configured with a preference index for the application server. The preference index may be a value that indicates a preference for the application server relative to other similar application servers. The capacity index, the load index, and/or the preference index can then be used to determine a routing cost associated with the application server. For example, the capacity index, the load index, and/or the preference index can be communicated across the IP network to the ingress routers for use in selecting a lowest cost application server associated with an anycast address. In another example, the capacity index, the load index, and/or the preference index can be aggregated at the egress router and transmitted across the network toward the ingress routers as a single value. In an example, the ingress router can determine the cost for the anycast traffic towards each application server. In an example, the ingress router can determine the routing cost by determining a network delay between the ingress router and the egress router. The ingress router can then compute the cost based on the network delay, the capacity index, the load index, and/or the preference index. The ingress router may select, based on costs to a plurality of application servers with a same anycast address, an application server from the plurality of application servers. The ingress router can then use the anycast address to route to the application server connected to the egress server with the lowest cost. By employing a more complex cost metric for routing, the anycast packets from the 5G network can be forwarded to the LDNs in the 5G edge computing network in a manner that supports effective load balancing. For example, the cost metric can ensure that under-utilized application servers receive anycast traffic even when closer over-utilized application servers are present. Further, the preference index can be used by network administrators to steer traffic to particular application servers as desired. Accordingly, the advertising mechanisms and corresponding cost metric address problems that are specific to the telecommunication arts.

FIG. 1 is a schematic diagram of an example 5G edge computing network 100. The network 100 includes a 5G network 110 and an IP network 120. A UE 101 can connect to the 5G network, which connects to the IP network 120. The IP network 120 can then connect to a local data network (LDN) 132, a LDN 135, and/or a LDN 138 containing an application server 133, an application server 136 and/or an application server 139, respectively. In this way, the UE 101 can communicate with an application server 133, 136, and/or 139 via the 5G network 110 and the IP network 120.

A UE 101 is any user device capable of communicating with a 5G network 110 over a wireless interface. A wide variety of UEs 101 include 5G communication capabilities, such as cell phones, tablets, computers, appliances, etc. A UE 101 includes hardware and some software. However, the UE 101 relies on a network-based application to provide some functionality. As a specific example, a UE 101 may be an autonomous vehicle that uses a wireless interface to communicate with an application operating at an application server 133, 136, and/or 139 for driving purposes. The application server 133, 136, and/or 139 may provide access to the same application. Accordingly, the UE 101 wishes to communicate with whichever application server 133, 136, and/or 139 provides the lowest latency service.

The UE 101 connects to the 5G network 110. The 5G network 110 includes various 5G sites 111. The 5G sites 111 are substantially similar, but are positioned at different geographical locations. The UE 101 connects to whichever 5G sites 111 are in range of the UE's 101 wireless interface and may move between 5G sites 111 when the UE 101 moves between geographic locations. The 5G sites 111 each contain a 3GPP compliant wireless communications device known as a gNodeB base station (gNB). The gNB (not shown) communicates wirelessly with the UE 101. The 5G sites 111 also contain a Protocol Data Unit (PDU) session anchor (PSA) 112. A PSA 112 is a 5G component configured to act as a session anchor point for mobility purposes in the corresponding 5G site 111. As an example, a UE 101 can initially be anchored to a PSA 112 in a 5G site 111. The UE 101 can communicate packets to the PSA 112 via a gNB, and the PSA 112 can forward such packets toward the IP network 120. Further, devices wishing to communicate with the UE 101 can send packets to the PSA 112, and the PSA 112 can forward such packets to the UE 101. Later, the UE 101 can move to another 5G site 111, in which case the session anchor responsibility is handed over to another PSA 112 at the new 5G site 111. The new PSA 112 can then forward packets back and forth between the UE 101 and the IP network 120. It should be noted that the 5G network 110 contains many other components that are not directly relevant to the current examples. Such components are omitted for clarity of discussion.

The IP network 120 is a group of interconnected network nodes that are addressable by IP addresses. An IP network 120 may include an IP version four (IPv4) network employing an IPv4 address space and/or an IP version six (IPv6) network employing a larger IPv6 address space. The IP network 120 includes many network nodes including an ingress router 113, an egress router 131, an egress router 134, and egress router 137. The ingress router 113 connects the 5G site 111 to the IP network 120. Likewise, the egress router 131, the egress router 134, and the egress router 137 connect the LDN 132, the LDN 135, and the LDNs 138, respectively, to the IP network 120. The ingress router 113, the egress router 131, the egress router 134, and the egress router 137 are each configured to apply packet filters to flows and route packets according to IP addresses contained in headers of the packets. The ingress router 113, the egress router 131, the egress router 134, and the egress router 137 are also configured to encapsulate packets with additional headers to create IP tunnels across the IP network 120 via network elements (NEs) 123. An IP tunnel is a path across a network between two points. Headers can be appended to the front of each packet in a flow of packets, which causes each packet to be routed along the path through the NEs 123 according to the headers resulting in an IP tunnel. The NEs 123 are internal routers that forward packets upstream and downstream across the IP network 120 based on the source addresses, destination addresses, and/or flow labels in headers contained in the packets.

In some examples, the IP network 120 may include and/or be connected to a route reflector 121. A route reflector 121 is a network node used in the Border Gateway Protocol (BGP). A route reflector 121 is a network node configured to receive network routes from peer nodes and re-advertise such routes to other specified peer nodes. For example, the route reflector 121 can be configured to receive routing information from egress router 131 and re-advertise such information to other network nodes that border the IP network 120, such as ingress router 113, egress router 134, and egress router 137 without re-advertising such routes to all of the internal NEs 123 in the IP network 120. This allows routing information to be exchanged between the border nodes without forwarding the routing information across the entire IP network 120, which in turn reduces signaling overhead in the IP network 120. The exchanged routing information can then be used by the border nodes to efficiently route packets across the IP network 120. This is in contrast to Interior Gateway Protocols (IGPs), such as OSPF protocol and Intermediate System to Intermediate System (ISIS) protocol, that broadcast routing information to every node in the IP network 120 (e.g., including both border nodes and NEs 123) and hence may not employ a route reflector 121.

LDNs 132, 135, and/or 138 are networks configured to connect computational components, such as servers, to the IP network 120. For example, LDNs 132, 135, and/or 138 may each be housed in a data center. An application server 133, an application server 136, and an application server 139 are computational components located in LDN 132, 135 and 138, respectively. For example, application servers 133, 136, and 139 may host applications that can be accessed by other components, such as UE 101. In an edge computing system, the application servers 133, 136, and 139 may be directly connected to the corresponding egress routers 131, 134, and 137, respectively, to support the lowest possible latency. In an example, the application servers 133, 136, and 139 each deploy different instances of the same application. Each instance may respond to input data in substantially the same manner, but each instance may receive different input data. Further, the application servers 133, 136, and 139 may all be assigned the same anycast address. An anycast address is a single destination IP address shared by multiple devices. Since the application servers 133, 136, and 139 are located in different LDNs 132, 135, and 138, respectively, the application servers 133, 136, and 139 are all positioned in different physical locations. Since the application servers 133, 136, and 139 all have the same anycast address, communications from UE 101 can be routed to whichever application server 133, 136, and/or 139 is physically closest to the UE 101. As such, the UE 101 can employ the anycast address to communicate with whichever application server 133, 136, and 139 is located closest to whichever 5G site 111 is currently connected to the UE 101. For example, anycast routing can use routing costs that consider a number of hops to forward communications.

Using anycast addresses in this manner has the advantage of reducing latency by ensuring the UE 101 is always communicating with the closest application server 133, 136, and/or 139. However, in some instances certain application servers 133, 136, and/or 139 may temporarily become overloaded while other application servers 133, 136, and/or 139 remain under-utilized. For example, the application server 133 may be positioned in close proximity to a sports stadium. In such a case, anycast traffic from users with UEs 101 present in the stadium would spike during games and drop off drastically after the games are over. So during the game, application server 133 becomes overloaded. Meanwhile, the application server 136 may be across town from the stadium. Since most of the people in the area are at the stadium during the game, the application server 136 is generally not the closest server during the game. Accordingly, application server 133 exhibits high latency while application server 136 is mostly idle. The same issue occurs for any user travel patterns, such as UE 101 movement during rush hour traffic, UE 101 movement to and from large office buildings during the work day, etc. Such movement is transient and difficult to predict. Hence, relocating application instances between LDNs 132, 135, and 138 to adjust for user mobility may not be a viable mechanism to balance the traffic load.

The present disclosure uses an updated cost algorithm to assist in load balancing such anycast traffic in a 5G edge computing network 100. For example, the border nodes of the IP network 120 responsible for selecting between application servers 133, 136, and 139 during anycast routing, such as the ingress router 113, can perform a cost computation that supports load balancing between the LDNs 132, 135, and 138 based on application server load. The details about the cost computation will be described in the following description.

The ingress router 113 can measure the network delay to each egress router 131, 134, and 137 by using round trip time (RTT) and similar mechanisms. However, the ingress router 113 is generally unaware of the other items related to the cost computation. Further, application servers 133, 136, and 139 may be configured to avoid sharing application load information across the network for security reasons. Accordingly, in the present disclosure, the egress routers 131, 134, and 137 each maintain routing costs metrics or routing cost information related to the attached application servers 133, 136, and 139, respectively. The egress routers 131, 134, and 137 then transmit the routing cost information toward the ingress router 113 via the IP network 120.

For example, each egress routers 131, 134, and 137 can maintain a load index and a capacity index for corresponding attached application servers 133, 136, and 139, respectively. In an example, the load index describes a number of packets communicated between the egress router 131, 134, and/or 137 and the corresponding application server 133, 136, and/or 139 over a fixed time period. For example, the load index can be obtained by measuring packets traversing the egress router 131, 134, and/or 137 over the fixed time period. In an example, the capacity index is a numerical value indicating a number of packets the application server 133, 136, and/or 139 can process over the fixed time period. The capacity index can be programmed into the corresponding egress routers 131, 134, and/or 137 memory by a network administrator.

Further, each egress routers 131, 134, and/or 137 can maintain a preference index of the corresponding application server 133, 136, and/or 139. The preference index may be a numerical value that indicates whether certain application servers 133, 136, and/or 139 are preferred over other application servers 133, 136, and/or 139. The preference index for each application server 133, 136, and/or 139 can be programmed into the memory of the corresponding egress routers 131, 134, and/or 137 by a network administrator.

The egress routers 131, 134, and/or 137 can communicate the routing cost information to the ingress router 113 for use in routing anycast traffic. For example, each egress router 131, 134, and/or 137 can communicate an aggregated metric that includes the capacity index, the load index, and/or the preference index. In another example, each egress router 131, 134, and/or 137 can communicate the capacity index, the load index, and/or the preference index as separate data items. In yet another embodiment, each egress router 131, 134, and/or 137 can communicate the raw data used to compute the load index.

Further, the egress routers 131, 134, and/or 137 can communicate such the routing cost information using IGPs, such as OSPF protocol and/or the ISIS protocol, or using BGP. For example, each egress router 131, 134, and/or 137 can communicate the routing cost information using an advertisement to all nodes in the network, which would include ingress router 113 by using OSPF link state advertisements (LSAs) or ISIS link state packet data unit (LSPs). In another example, each egress router 131, 134, and/or 137 can communicate the routing cost information to the route reflector 121 for re-advertisement to the ingress router 113 according to BGP by employing a BGP update message. Network components operating OSPF, ISIS, and/or BGP ensure that the advertised routing cost information is received by all egress routers 131, 134, and 137 as well as all ingress routers 113. The ingress router 113 can then use the measured network delay along with the received capacity index, the load index, and/or the preference index to compute a routing cost for each egress router 131, 134, and/or 137. By using the load measurement constrained shortest path first metric to route anycast traffic, the traffic from the UE 101 is load balanced based on the relative utilization (load) at each application server 133, 136, and/or 139 along with administrator preferences in the preference index and distance to the application server in the network delay. This procedure addresses one or more of the problems discussed above, for example by rerouting anycast traffic away from an over-utilized application server and toward an under-utilized application server regardless of underlying reason for the under/over utilization. Accordingly, the present application provides a mechanism to load balance anycast traffic from a UE 101, and hence solves a problem specific to the telecommunications industry.

Figure 2:
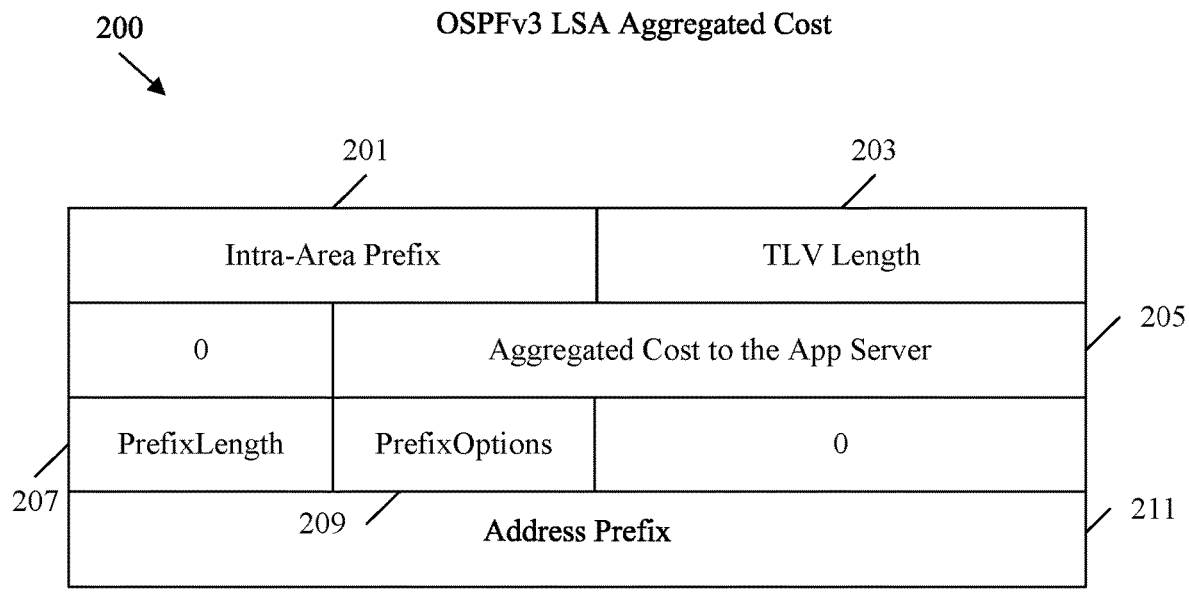
FIG. 2 illustrates an example Open Shortest Path First (OSPF) version three (OSPFv3) link state advertisement (LSA) for communicating anycast routing cost information.

FIG. 2 illustrates an example OSPFv3 LSA 200 for communicating anycast routing cost information according to an OSPF protocol. In this embodiment, the anycast routing cost information is an aggregated cost. An egress router, such as egress router 131 in the 5G edge computing network 100, may use an OSPFv3 LSA 200 when operating in an IPv6 network. In such an example, the egress router 131 determines an aggregated cost to an attached application server, such as application server 133, and includes the aggregated cost in the OSPFv3 LSA 200. The egress router 131 can broadcast the OSPFv3 LSA 200 across the network. An ingress router, such as ingress router 113, can then extract the aggregated cost from the OSPFv3 LSA 200 and route anycast traffic according to the aggregated cost. The ingress router may perform an application information (metadata) constrained path selection for the anycast traffic in accordance with the aggregated cost. Accordingly, the OSPFv3 LSA 200 supports load balancing anycast traffic in a 5G edge computing network.

The OSPFv3 LSA 200 includes an Intra-Area Prefix field 201, which may be sixteen bits long and may extend from bit position zero to bit position fifteen. The Intra-Area Prefix field 201 may contain a value that indicates the OSPFv3 LSA 200 is an intra-area-prefix LSA. For example, the Intra-Area Prefix field 201 can be set to a value of six. The OSPFv3 LSA 200 also includes a Type Length Value (TLV) length field 203, which may be sixteen bits long and may extend from bit position sixteen to bit position thirty-one. The TLV length field 203 can be set to a value that indicates the length of the OSPFv3 LSA 200 in bits. The OSPFv3 LSA 200 also includes an aggregated cost to the Application (app) Server field 205, which may be twenty-four bits long and may extend from bit position eight to bit position thirty-one. The aggregated cost to the App Server field 205 contains the aggregated cost to the application server. For example, the egress router can determine the capacity index, the load index, and/or the preference index for the application server and include such data as a weighted combined value (cost). The cost can be calculated based on a formula (3) described in the disclosure. The weighted combined value can be provide to an ingress router for use in an application information (metadata) path selection.

The OSPFv3 LSA 200 also includes a prefix length field 207, which may be eight bits long and may extend from bit position one to bit position seven. The prefix length field 207 indicates the length in bits of the advertised address prefix. The OSPFv3 LSA 200 also includes a prefix options field 209, which may be eight bits long and may extend from bit position eight to bit position fifteen. The prefix options field 209 includes a set of bits that are set to indicate routing capabilities related to the advertised address prefix. The data from the prefix options field 209 can be used as input for routing calculations. The OSPFv3 LSA 200 also includes an address prefix field 211, which may be of variable length and may extend from bit position one to bit position thirty-one in successive octets. The address prefix field 211 contains an advertised IPv6 address prefix related to the application server. For example, the address prefix field 211 may include the IPv6 address prefix for the application server and/or the egress router transmitting the OSPFv3 LSA 200. The OSPFv3 LSA 200 may also include various fields, which may be set to zero and ignored as shown. Such fields may be reserved for other purposes.

Figure 3:
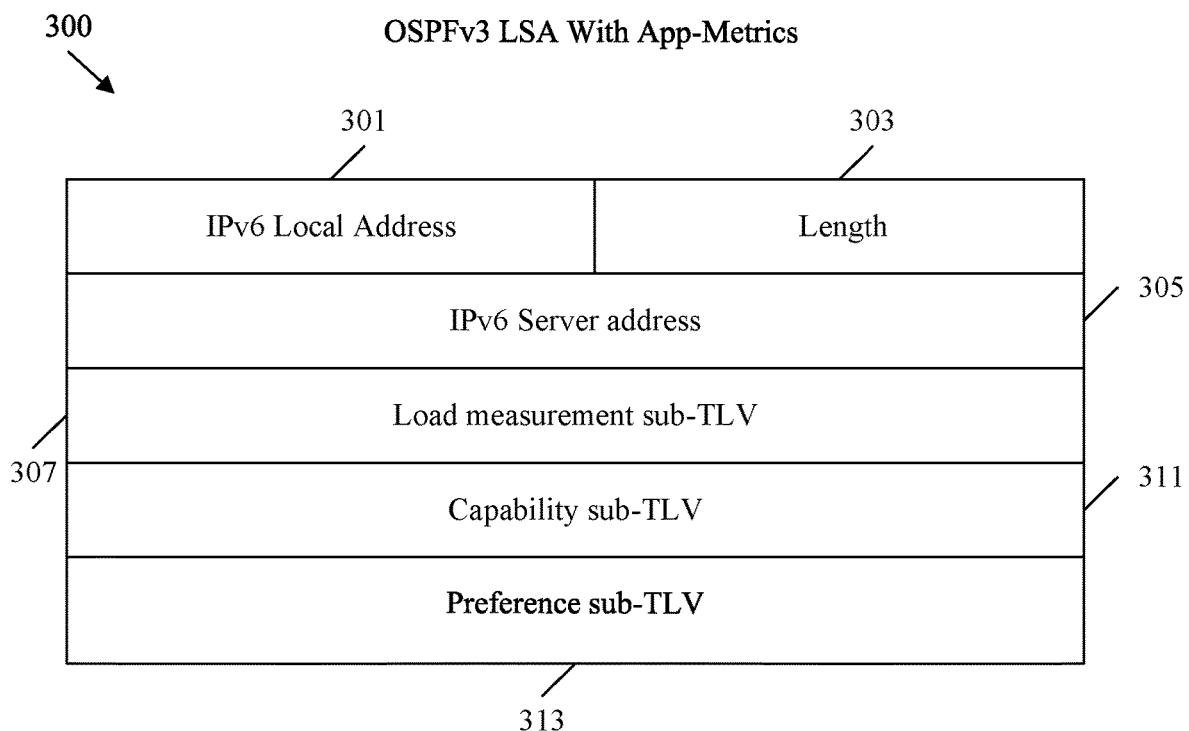
FIG. 3 illustrates an example OSPFv3 LSA for communicating anycast routing cost information.

FIG. 3 illustrates an example OSPFv3 LSA 300 for communicating anycast routing cost information according to an OSPF protocol. For example, an egress router, such as egress router 131 in the 5G edge computing network 100, may use an OSPFv3 LSA 300 when operating in an IPv6 network. In such an example, the egress router 131 determines routing cost information for an attached application server, such as application server 133, and includes the routing cost information in the OSPFv3 LSA 300 as separate application server metrics. The egress router 131 can broadcast the OSPFv3 LSA 300 across the network. An ingress router, such as ingress router 113, can then extract the routing cost information from the OSPFv3 LSA 300 and route anycast traffic according to the routing cost information. Accordingly, the OSPFv3 LSA 300 supports load balancing anycast traffic in a 5G edge computing network.

The OSPFv3 LSA 300 includes an IPv6 local address field 301, which may be sixteen bits long and may extend from bit position zero to bit position fifteen. The IPv6 local address field 301 may contain a value that indicates the OSPFv3 LSA 300 is an IPv6 local address LSA. For example, the IPv6 local address field 301 can be set to a value of seven. The OSPFv3 LSA 300 includes a length field 303, which may be sixteen bits long and may extend from bit position sixteen to bit position thirty-one. The length field 303 includes the length of the OSPFv3 LSA 300 in bits. The OSPFv3 LSA 300 includes an IPv6 server address field 305, which may be of variable length and may extend from bit position one to bit position thirty-one in successive octets. The IPv6 server address field 305 includes the anycast address of the application server in IPv6 format.

The OSPFv3 LSA 300 includes a load measurement sub-TLV 307, which may be of variable length and may extend from bit position one to bit position thirty-one in successive octets. The load measurement sub-TLV 307 includes a load index of the application server, for example in a sub-TLV format. For example, the load index can indicate the weighted combination of the total packets or bytes communicated between the application server and the egress router over a fixed time period as measured by the egress router. The OSPFv3 LSA 300 includes a capability sub-TLV 311, which may be of variable length and may extend from bit position one to bit position thirty-one in successive octets. The capability sub-TLV 311 can include an capacity index indicating an capacity of the application server, for example in a sub-TLV format. The capacity index may be a numerical value indicating a number of packets the application server can process over the fixed time period as configured into the egress router. The OSPFv3 LSA 300 includes a preference sub-TLV 313, which may be of variable length and may extend from bit position one to bit position thirty-one in successive octets. The preference sub-TLV 313 can indicate a preference index, for example in a sub-TLV format. The preference index can indicate a preference level for routing to the application server as configured into the egress router.

Figure 4:
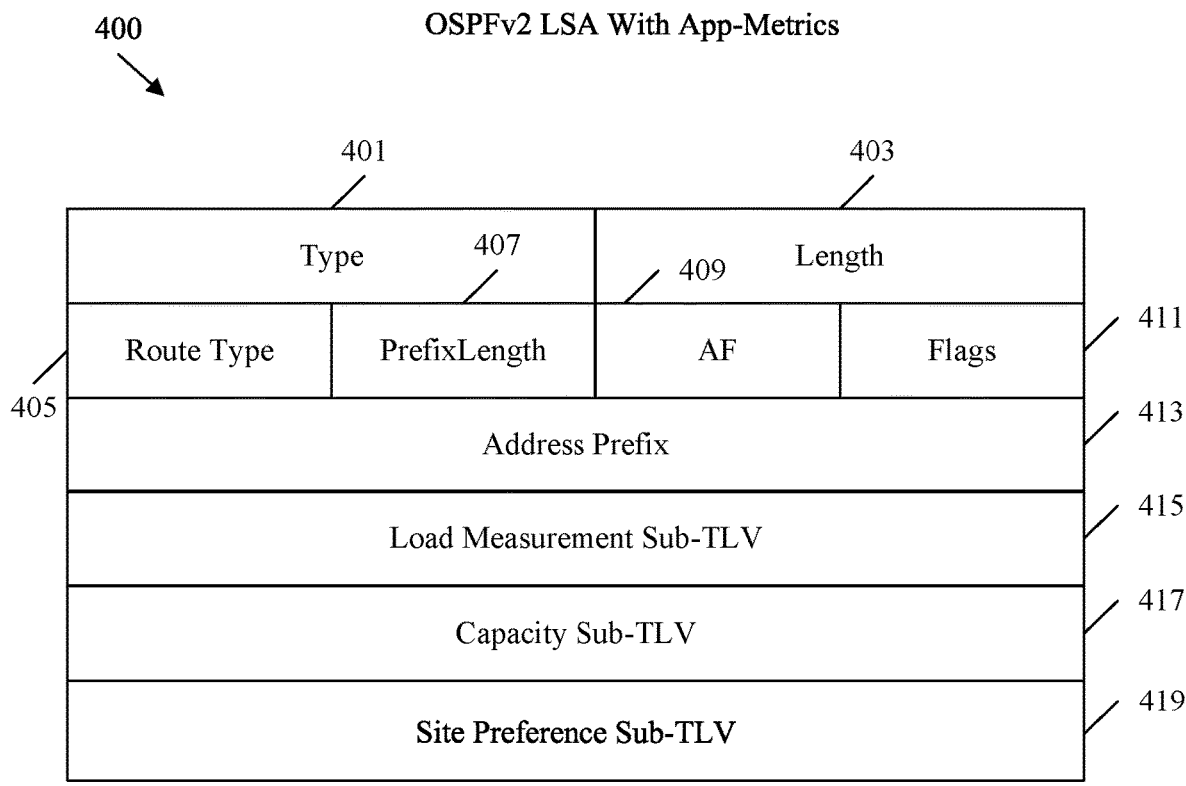
FIG. 4 illustrates an example OSPF version two (OSPFv2) LSA for communicating anycast routing cost information.

FIG. 4 illustrates an example OSPFv2 LSA 400 for communicating anycast routing cost information according to an OSPF protocol as separate application server metrics. For example, an egress router, such as egress router 131 in the 5G edge computing network 100, may use an OSPFv2 LSA 400 when operating in an IPv4 network. In such an example, the egress router 131 determines routing cost information for an attached application server, such as application server 133, and includes the routing cost information in the OSPFv2 LSA 400 as separate application server metrics. The egress router 131 can broadcast the OSPFv2 LSA 400 across the network. An ingress router, such as ingress router 113, can then use from the OSPFv2 LSA 400 to compute an application information (MetaData) constrained optimal path metric (e.g. an aggregated cost) and then route anycast traffic according to the application information constrained optimal path metric. Accordingly, the OSPFv2 LSA 400 supports load balancing anycast traffic in an 5G edge computing network.

The OSPFv2 LSA 400 includes a type field 401, which may be sixteen bits long and may extend from bit position zero to bit position fifteen. The type field 401 may be set to a value to indicate the OSPFv2 LSA 400 is an OSPFv2 extended prefix LSA, for example a value of one. The OSPFv2 LSA 400 also includes a length field 403, which may be sixteen bits long and may extend from bit position sixteen to bit position thirty-one. The length field 403 indicates the length of the OSPFv2 LSA 400 in bits. The OSPFv2 LSA 400 also includes a route type field 405, which may be eight bits long and may extend from bit position one to bit position seven. The route type field 405 indicates the type of OSPFv2 route that is advertised in the OSPFv2 LSA 400. The OSPFv2 LSA 400 also includes a prefix length field 407, which may be eight bits long and may extend from bit position eight to bit position fifteen. The prefix length field 407 may include the length of the advertised address prefix in bits. The OSPFv2 LSA 400 also includes an address family (AF) field 409, which may be eight bits long and may extend from bit position sixteen to bit position twenty-three. The AF field 409 indicates the address family for the advertised prefix. The OSPFv2 LSA 400 also includes a flags field 411, which may be eight bits long and may extend from bit position twenty-four to bit position thirty-one. The flags field 411 contains a set of flags that are applicable to the advertised prefix. The OSPFv2 LSA 400 also includes an address prefix field 413, which may be thirty-two bits long and may extend from bit position one to bit position thirty-one. The address prefix field 413 includes the advertised IPv4 address prefix for the application server.

The OSPFv2 LSA 400 includes a load measurement sub-TLV 415, which may be of variable length and may extend from bit position one to bit position thirty-one in successive octets. The load measurement sub-TLV 415 includes a load index of the application server, for example in a sub-TLV format. For example, the load index can indicate the weighted combination of the total packets or bytes communicated between the application server and the egress router over a fixed time period as measured by the egress router. The OSPFv2 LSA 400 includes a capacity sub-TLV 417, which may be of variable length and may extend from bit position one to bit position thirty-one in successive octets. The capacity sub-TLV 417 can indicate the capacity index for the application server, for example in a sub-TLV format. The capacity index may be a numerical value indicating a number of packets the application server can process over the fixed time period as configured into the egress router. The OSPFv2 LSA 400 includes a site preference sub-TLV, 419 which may be of variable length and may extend from bit position one to bit position thirty-one in successive octets. The site preference sub-TLV 419 can indicate a preference index, for example in a sub-TLV format. The preference index can indicate a preference level for routing to the application server as configured into the egress router.

Figure 5:
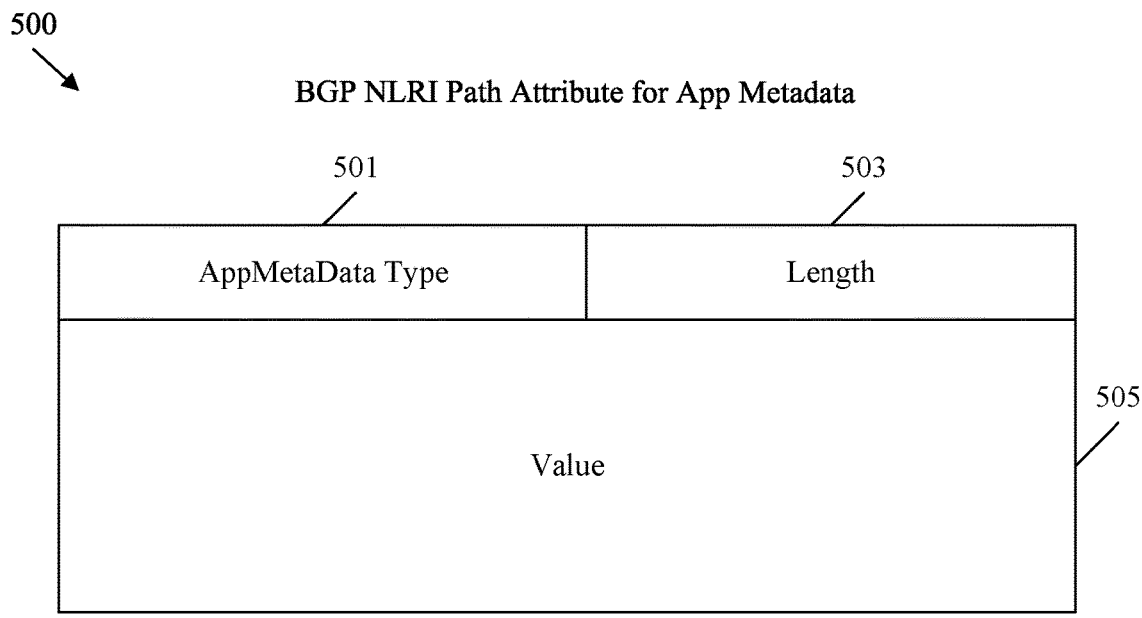
FIG. 5 illustrates an example Border Gateway Protocol (BGP) Network Layer Reachability Information (NLRI) path attribute for communicating application metadata.

FIG. 5 illustrates an example BGP NLRI path attribute 500 for communicating application metadata according to a BGP protocol. For example, an egress router, such as egress router 131 in the 5G edge computing network 100, may use a BGP update message that includes a BGP NLRI path attribute 500 when operating in an IPv4 or an IPv6 network. In such an example, the egress router 131 determines routing cost information for an attached application server, such as application server 133, and includes the routing cost information in the BGP NLRI path attribute 500 as one or more sub-TLVs. The egress router 131 can transmit the BGP update including the BGP NLRI path attribute 500 toward a route reflector, such as route reflector 121. The route reflector can then forward the BGP update including the BGP NLRI path attribute 500 to all of the border nodes in the IP network, including an ingress router, such as ingress router 113. The ingress router can then extract the routing cost information from the BGP NLRI path attribute 500 and route anycast traffic in according with the extracted routing cost information. The ingress router can perform an application information (metadata) constrained path selection for the anycast traffic based on the extracted routing cost information. Accordingly, the BGP NLRI path attribute 500 supports load balancing anycast traffic in a 5G edge computing network.

The BGP NLRI path attribute 500 includes an application metadata (AppMetaData) Type field 501, which may be sixteen bits long and may extend from bit position one to bit position fifteen. The AppMetaData Type field 501 may be set to a value to indicate the BGP NLRI path attribute 500 includes metadata for an application server. The BGP NLRI path attribute 500 also includes a length field 503, which may be sixteen bits long and may extend from bit position sixteen to bit position thirty-one. The length field 503 may be set to a value to indicate the length of the BGP NLRI path attribute 500 in bits. The BGP NLRI path attribute 500 also includes a value field 505, which may be of variable length and may extend from bit position one to bit position thirty-one in successive octets. The value field 505 contains one or more sub-TLVs that include routing cost information for an application server.

Figure 6:
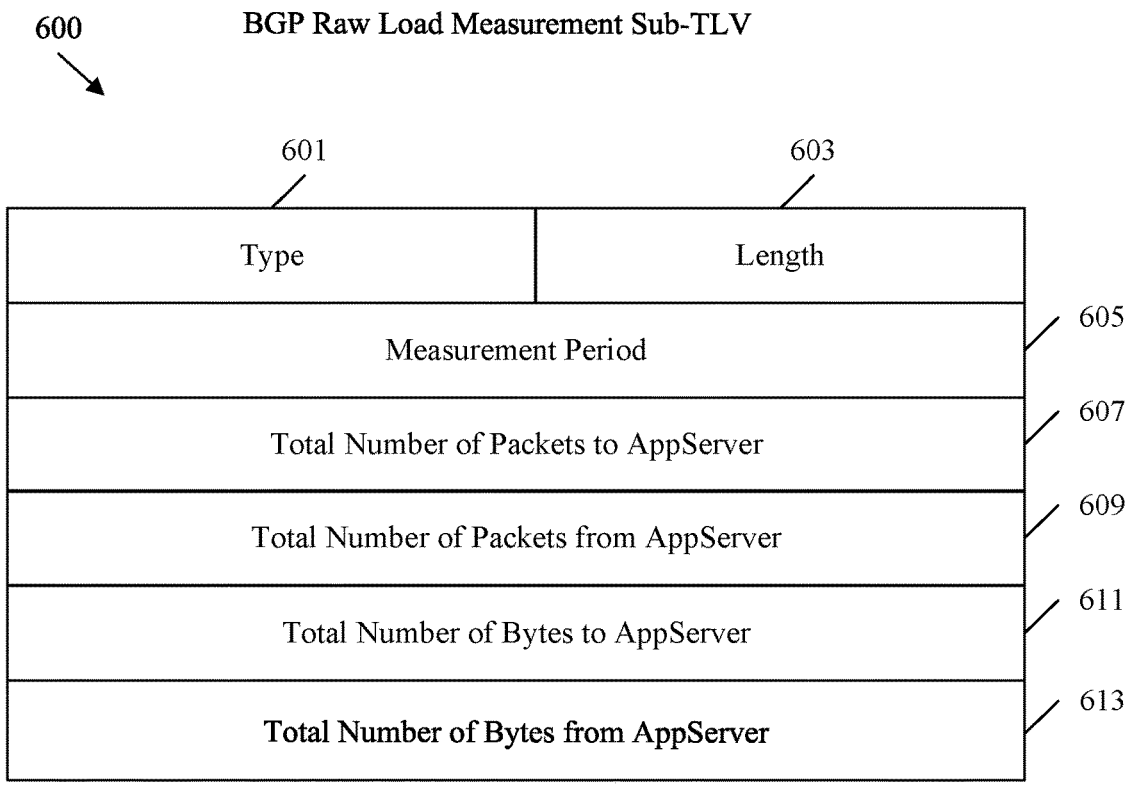
FIG. 6 illustrates an example BGP raw load measurement sub-Type Length Value (sub-TLV) for communicating anycast routing cost information.

FIG. 6 illustrates an example BGP raw load measurement sub-TLV 600 for communicating anycast routing cost information as separate application server metrics in a BGP NLRI path attribute, such as the BGP NLRI path attribute 500. Specifically, the BGP raw load measurement sub-TLV 600 contains data measured by an egress router that can be used to calculate the load index at the application server. As discussed above, the load index describes a number of packets/bytes communicated between the egress router and the application server over the fixed time period.

The BGP raw load measurement sub-TLV 600 includes a type field 601, which may be sixteen bits long and may extend from bit position one to bit position fifteen. The type field 601 includes a value set to indicate that the BGP raw load measurement sub-TLV 600 contains raw measurements of packet and/or bytes to and/or from an application server associated with an anycast address. The BGP raw load measurement sub-TLV 600 also includes a length field 603, which may be sixteen bits long and may extend from bit position sixteen to bit position thirty one. The length field 603 may be set to a value to indicate the length of the BGP raw load measurement sub-TLV 600 in bits.

The BGP raw load measurement sub-TLV 600 also includes a measurement period field 605, which may be thirty two bits long and may extend from bit position one to bit position thirty one. The measurement period field 605 includes a period, in seconds, for which the egress router measured packet and/or bytes to and/or from an application server. The measurement period field 605 may be set by an administrator, but may have a default value of 3600 seconds. The BGP raw load measurement sub-TLV 600 may also include a total number of packets to AppServer field 607, which may be thirty two bits long and may extend from bit position one to bit position thirty one. The total number of packets to AppServer field 607 includes the total number of packets sent from the egress server to the application server over the measurement period. The BGP raw load measurement sub-TLV 600 may also include a total number of packets from AppServer field 609, which may be thirty two bits long and may extend from bit position one to bit position thirty one. The total number of packets from AppServer field 609 includes the total number of packets received by the egress server from the application server over the measurement period.

Figure 7:
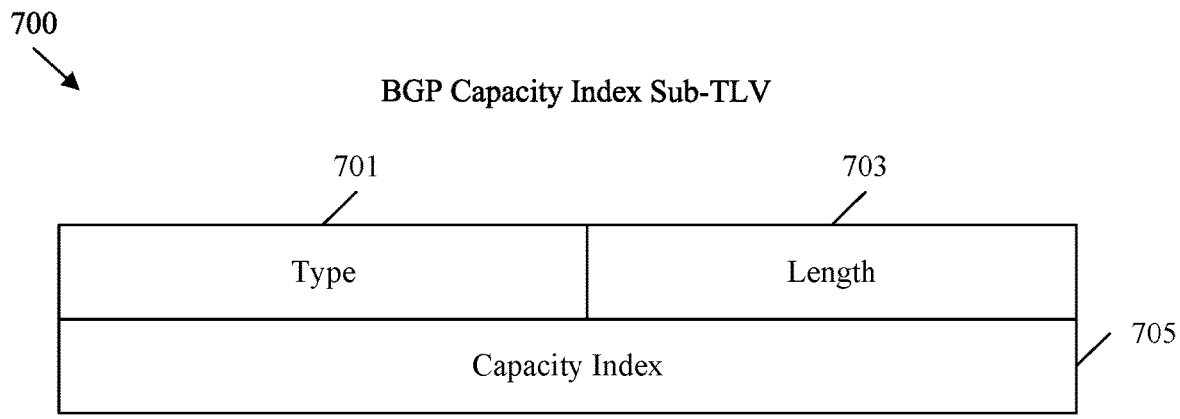
FIG. 7 illustrates an example BGP capacity index sub-TLV for communicating a capacity index for an application server.

The BGP raw load measurement sub-TLV 600 may also include a total number of bytes to AppServer field 611, which may be thirty two bits long and may extend from bit position one to bit position thirty one. The total number of bytes to AppServer field 611 includes the total number of bytes sent from the egress server to the application server over the measurement period. The BGP raw load measurement sub-TLV 600 may also include a total number of bytes from AppServer field 613, which may be thirty two bits long and may extend from bit position one to bit position thirty one. The total number of bytes from AppServer field 613 includes the total number of bytes received by the egress server from the application server over the measurement period. It should be noted that in some examples, the BGP raw load measurement sub-TLV 600 may include the number of bytes sent and received and omit the number of packets sent and received. In other examples, the BGP raw load measurement sub-TLV 600 may include the number of packets sent and received and omit the number of bytes sent and received FIG. 7 illustrates an example BGP capacity index sub-TLV 700 for communicating a capacity index for an application server in a BGP NLRI path attribute, such as the BGP NLRI path attribute 500. Specifically, the BGP capacity index sub-TLV 700 may contain a numerical value indicating a number of packets the application server can process over the fixed time period. The BGP capacity index sub-TLV 700 includes a type field 701, which may be sixteen bits long and may extend from bit position one to bit position fifteen. The type field 701 includes a value set to indicate that the BGP capacity index sub-TLV 700 contains a capacity index for an application server associated with an anycast address. The BGP capacity index sub-TLV 700 also includes a length field 703, which may be sixteen bits long and may extend from bit position sixteen to bit position thirty one. The length field 703 may be set to a value to indicate the length of the BGP capacity index sub-TLV 700 in bits. The BGP capacity index sub-TLV 700 also includes a capacity index field 705, which may be thirty two bits long and may extend from bit position one to bit position thirty one. The capacity index field 705 includes the capacity index for an associated application server. The capacity index contained in the capacity index field 705 may be configured into the egress router by a system administrator. Because the capacity index is a relatively static value, the BGP capacity index sub-TLV 700 may not be included in every BGP update message. For example, the BGP capacity index sub-TLV 700 may only be sent periodically, when the capacity index changes, and/or when the egress router becomes aware of a change in the nodes indicating a new node in the IP network, etc.

Figure 8:
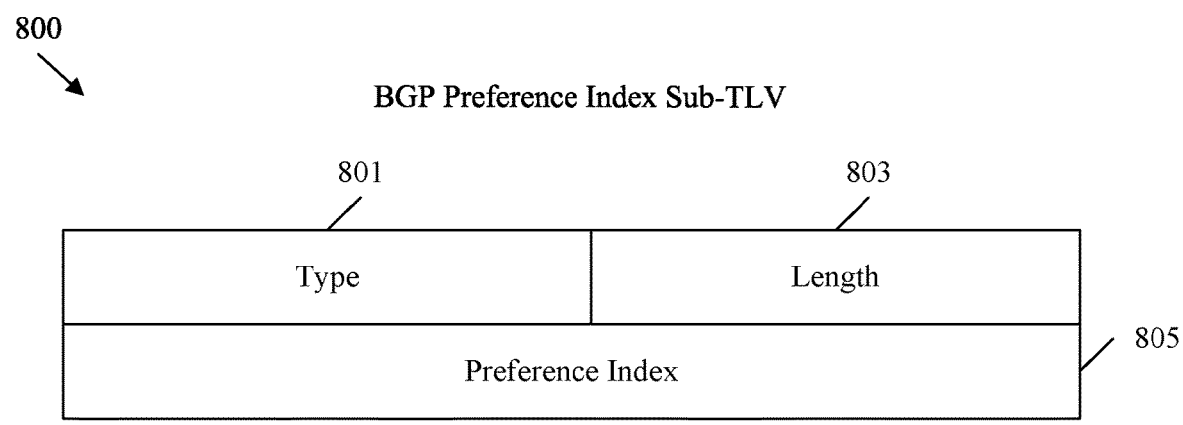
FIG. 8 illustrates an example BGP preference index sub-TLV for communicating a preference index for an application server.

FIG. 8 illustrates an example BGP preference index sub-TLV 800 for communicating a preference index for an application server in a BGP NLRI path attribute, such as the BGP NLRI path attribute 500. Specifically, the BGP preference index sub-TLV 800 may contain a value that indicates a preference for the application server relative to other similar application servers. The BGP preference index sub-TLV 800 includes a type field 801, which may be sixteen bits long and may extend from bit position one to bit position fifteen. The type field 801 includes a value set to indicate that the BGP preference index sub-TLV 800 contains a preference index for an application server associated with an anycast address. The BGP preference index sub-TLV 800 also includes a length field 803, which may be sixteen bits long and may extend from bit position sixteen to bit position thirty one. The length field 803 may be set to a value to indicate the length of the BGP preference index sub-TLV 800 in bits. The BGP preference index sub-TLV 800 also includes a preference index field 805, which may be thirty two bits long and may extend from bit position one to bit position thirty one. The preference index field 805 includes the preference index for an associated application server. The preference index contained in the preference index field 805 may be configured into the egress router by a system administrator, and may be used to steer traffic toward (higher value) or away from (lower value) a corresponding application server. Because the preference index is a relatively static value, the BGP preference index sub-TLV 800 may not be included in every BGP update message. For example, the BGP preference index sub-TLV 800 may only be sent periodically, when the preference index changes, and/or when the egress router becomes aware of a change in the nodes indicating a new node in the IP network, etc.

Figure 9:
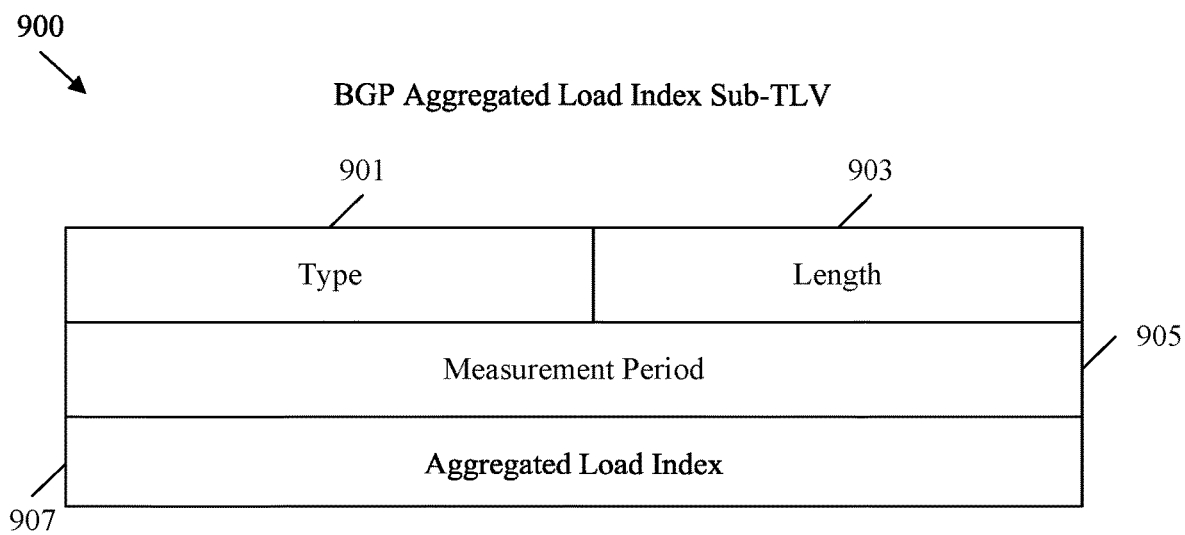
FIG. 9 illustrates an example BGP aggregated load index sub-TLV for communicating a load information for an application server.

FIG. 9 illustrates an example BGP aggregated load index sub-TLV 900 for communicating a load information for an application server in a BGP NLRI path attribute, such as the BGP NLRI path attribute 500. Specifically, the BGP aggregated load index sub-TLV 900 may contain a load index describing a number of packets communicated between the egress router and the application server over a fixed time period. For example, the BGP aggregated load index sub-TLV 900 may contain similar data to the BGP raw load measurement sub-TLV 600. However, the BGP aggregated load index sub-TLV 900 aggregates the load data describing the packet and/or bytes sent to and/or from the application server into a single load index value. The BGP aggregated load index sub-TLV 900 includes a type field 901, which may be sixteen bits long and may extend from bit position one to bit position fifteen. The type field 901 includes a value set to indicate that the BGP aggregated load index sub-TLV 900 contains a load index for an application server associated with an anycast address. The BGP aggregated load index sub-TLV 900 also includes a length field 903, which may be sixteen bits long and may extend from bit position sixteen to bit position thirty one. The length field 903 may be set to a value to indicate the length of the BGP aggregated load index sub-TLV 900 in bits.

The BGP aggregated load index sub-TLV 900 also includes a measurement period field 905, which may be thirty two bits long and may extend from bit position one to bit position thirty one. The measurement period field 905 includes a period, in seconds, for which the egress router measured packet and/or bytes to and/or from an application server. The measurement period field 905 may be set by an administrator, but may have a default value of 3600 seconds. The BGP aggregated load index sub-TLV 900 also includes an aggregated load index field 907, which may be thirty two bits long and may extend from bit position one to bit position thirty one. The aggregated load index field 907 includes an aggregated load index, which may be derived from a weighted combination of packets sent to the application server, bytes sent to the application server, packets received from the application server, and bytes received from the application server. In an example, the aggregated load index can be computed according to:

$$\text{Index} = w1*\text{ToPackets} + w2*\text{FromPackets} + w3*\text{ToBytes} + w4*\text{FromBytes} \quad (1)$$

where Index is the aggregated load index, ToPackets is a measurement of packets sent to the application server during the measurement period, FromPackets is a measurement of packets received from the application server during the measurement period, ToBytes is a measurement of bytes sent to the application server during the measurement period, FromBytes is a measurement of bytes received from the application server during the measurement period, and w1, w2, w3, and w4 are weighting factors each between zero and one where w1, w2, w3, and w4 collectively equal one.

In an example, the preceding embodiments may be implemented as follows. This draft describes example OSPF extensions for routers to advertise/distribute the 5G Edge Computing Application (App) running status and environment of the directly attached 5G Edge Computing servers. The application metadata (AppMetaData) can be used by the other routers in the 5G LDN to make intelligent decisions to optimize the forwarding of flows from UEs. The goal is to improve latency and performance for 5G Edge Computing services.

5G Edge Computing is now discussed. In an example, it is desirable for a mission critical Application to have multiple Application Servers hosted in multiple Edge Computing data centers to minimize latency and to optimize the user experience. Those Edge Computing data centers are usually very close to or co-located with 5G base stations. When a UE initiates application packets using the destination address from a Domain Name System (DNS) reply or its cache, the packets from the UE are carried in a Packet Data Unit (PDU) session through the 5G Core (5GC) to the 5G User Plan Function PDU Session Anchor (UPF-PSA). The UPF-PSA decapsulates the 5G General Packet Radio Service (GPRS) Tunneling Protocol (GTP) outer header and forwards the packets from the UEs to the ingress router of the Edge Computing (EC) Local Data Network (LDN), which is responsible for forwarding the packets to the intended destinations.

When the UE moves out of coverage of its current next-generation Node B (gNB), the handover procedure is initiated which includes the 5G Session Management Function (SMF) selecting a new UPF-PSA. When the handover process is complete, the UE has a new IP address and the IP point of attachment is to the new UPF-PSA. The 5GC may maintain a path from the old UPF to the new UPF for a short time for Session and Service Continuity (SSC) mode 3 to make the handover process more seamless.

A first problem for anycast routing in the 5G EC Environment is discussed. anycast may be used extensively by various application providers and Content Data Networks (CDNs) because anycast makes it possible to dynamically load balance across server locations based on network conditions. With multiple servers having the same anycast address, it eliminates the single point of failure and bottleneck at the application layer load balancers. Another benefit of using anycast addresses is removing the dependency on how UEs get the IP addresses for their Applications. Some UEs (or clients) might use stale cached IP addresses for an extended period. But, having multiple locations of the same anycast address in a 5G EC environment can be problematic because all those edge computing data centers can be close in proximity. There might be very little difference in the routing cost to reach the Application Servers in different Edge DCs, which can cause packets from one flow to be forwarded to different locations, resulting in service glitches.

A second problem for anycast routing in the 5G EC Environment relates to unbalanced anycast distribution due to UE mobility. UEs' frequent movement from one 5G site to another can make it difficult to plan where the Application Servers should be hosted. When one Application Server is heavily utilized, other Application Servers of the same address close-by can be very under-utilized. Since the condition can be short-lived, it is difficult for the application controller to anticipate the move and adjust.

A third problem for anycast routing in the 5G EC Environment relates to application server relocation. When an Application Server is added to, moved, or deleted from a 5G EC data center, the reachability, the utilization, and the capacity for the data center might change. For the ease of description, the Edge Computing server, Application Server, App Server may be used interchangeably throughout this document.

Egress Router to an Application Server (A-ER), can be used to describe the last router to which the Application Server is attached. For a 5G EC environment, the A-ER can be the gateway router to an EC data center. An Application Server may be a physical or virtual server that hosts the software system for the application. An Application Server Location may represent a cluster of servers at one location serving the same Application. One application may have a layer seven load balancer, whose address(es) are reachable from an external IP network, in front of a set of application servers. From an IP network perspective, this whole group of servers can be considered as the Application server at the location. An Edge Application Server may be used interchangeably with Application Server. An Edge Hosting Environment may be an environment providing the support for an Edge Application Server's execution. An Edge Data Center (DC) may provide the Edge Computing Hosting Environment. It might be co-located with a 5G Base Station and not only host 5G core functions, but may also host frequently used Edge server instances.

A solution overview for one or more of the abovementioned problems is discussed. From the IP Layer, the Application Servers are identified by their IP/anycast addresses. To a router, having multiple servers with the same anycast address attached to different egress routers is same as having multiple paths to reach the anycast address. There are many tools available to influence the path selection on a router, such as the routing distance, traffic engineering (TE) metrics, policies, etc. This draft describes a solution to add a Site-Cost to influence the path selection. The Site-Cost, which is derived from site-capacity+load measurement+ Preference, can be raw measurements collected by the egress routers based on the instructions from a controller or can be informed by the App Controller periodically. The disclosed solution is for the egress routers that have a direct connection to the Application Servers to collect desired measurements about the Servers' running status and advertise the metrics to other routers in 5G EC network. The solution assumes that the 5G Edge Computing controller or management system is aware of the anycast addresses that need optimized forwarding. To minimize the processing on routers, only the application flows that match with the access control lists (ACLs) configured by the 5G Edge Computing controller may collect and advertise the desired measurements.

Flow Affinity to an anycast server is now discussed. In a network with multiple Edge Computing Servers or App Layer Load Balancers with the same anycast address attached to multiple A-ERs, Flow Affinity indicates routers sending the packets of the same flow to the same A-ER even if the cost towards the A-ER is no longer optimal. Routers may support some forms of flow affinity to ensure packets belonging to one flow be forwarded along the same path. For IPv6 traffic, Flow Affinity can be supported by the routers of the LDN forwarding the packets with the same Flow Label in the packets' IPv6 Header along the same path towards the same egress router.

IP Layer Metrics to gauge App Server running status are now discussed. Most applications do not expose their internal logic to the network. Their communications are generally encrypted. Most of them do not even respond to PING or Internet Control Message Protocol (ICMP) messages initiated by routers or network gears. IP Layer Metrics that can be used to gauge the application servers running status and environment. For example, an IP layer Metric for App Server Load Measurement can be employed. The Load Measurement to an App Server is a weighted combination of the number of packets/bytes to the App Server and the number of packets/bytes from the App Server, which are collected by the A-ER that has the direct connection to the App Server. The A-ER is configured with an ACL that can filter out the packets for the Application Server. Further, a Capacity Index can be used to differentiate the running environment of the attached application server. Some data centers can have hundreds, or thousands, of servers behind an application server's App Layer Load Balancer. Other data centers can have a very small number of servers for the application. A Capacity Index, which is a numeric number, can be used to represent the capacity of the application server attached to an A-ER. A Site preference index can be used in a scenario that some sites are more preferred for handling an application than others for flows from a specific UE. For ease of description, those metrics are called IP Layer App-Metrics.

Equalizing traffic among Multiple anycast Locations is discussed. One benefit of using anycast is to leverage the network layer information to balance the traffic among multiple Application Server locations. For a 5G Edge Computing environment, the routers in the LDN should be notified of various measurements of the App Servers attached to each A-ER to make the intelligent decision on where to forward the traffic for the application from UEs. Various algorithms can be used by the routers in LDN to compare the cost to reach the App Servers between the Site-i or Site-j such as:

$$\text{cost} = \min_j \left\{ \frac{\alpha L_j \beta_i}{L_i \beta_j} + \frac{(1-\alpha) D_j \gamma_i}{D_i \gamma_j} \right\} \quad (2)$$

In the above formula, $L_i$ represents a load measurement for the site-i, which can be the weighted combination of the total packets or/and bytes sent to and received from the Application Server at site-i during the certain time period; $L_j$ represents a load measurement for the site j, which can be the weighted combination of the total packets or/and bytes sent to and received from the Application Server at site-j during the certain time period. $\beta_i$ represents a capacity index which is used to represent the capacity of the Application Server at the site i and may be a numeric number 1-10, where a higher value indicates a higher capacity; $\beta_j$ represents a capacity index which is used to represent the capacity of the Application Server at the site j and may be a numeric number 1-10, where a higher value indicates a higher capacity. $D_i$ represents a network latency between a first ingress router and a first egress router attached to the Application Server at the site i, $D_j$ represents a network latency between a second ingress router and a second egress router attached to the Application Server at the site j. $\gamma_i$ represents a network preference for the site i, $\gamma_j$ represents a network preference for the site j, where a higher value indicates a higher preference. $\alpha$ represents the weighting factor for load and site information and has a value between zero and one. If smaller than 0.5, network latency and the site preference have more influence. Otherwise, the server load and corresponding capacity have more influence. In an embodiment, the weighting factor $\alpha$ is used to balance a server load with a network preference. The link cost between the egress routers to their attached servers are embedded in the capacity index. mini represents an egress router j that achieves a minimum cost.

The capacity index for any specific Application Server at a specific location can be provided by an application controller. If the capacity index is not given, the default can be set to 5 for all locations. $D_i$ and $D_j$ each are a Network latency measurement, such as Round Trip Time (RTT) to the egress router that has the Application Server attached at the site-i or site j. Ingress routers can measure RTT to all the egress routers by IP Performance Measurement (IPPM) metrics. But ingress routers may be unable to measure RTT to all the Application Servers. Egress routers can also measure RTT to the ingress routers by IPPM metrics.

In the above formula, $$\frac{\alpha L_j \beta_i}{L_i \beta_j} + \frac{(1-\alpha) D_j \gamma_i}{D_i \gamma_j}$$

represents the cost (identified by cost-j) to reach an Application Server attached to Site-j relative to an Application Server attached to another site, Site-i.

$$\text{cost} - j = \frac{\alpha L_j \beta_i}{L_i \beta_j} + \frac{(1-\alpha) D_j \gamma_i}{D_i \gamma_j} \quad (3)$$

Reason for using an Interior Gateway Protocol (IGP) based solution is discussed. IGP can be used to propagate the IP Layer App-Metrics, and doing so can have the following benefits. Intermediate routers can derive an aggregated cost from the IP Layer App-Metrics carried by IGP message to reach the Application Servers attached to different egress routers. For example, the path to the optimal egress router can be more accurate or shorter. Convergence is also shorter when there is any failure along the way towards the optimal anycast server. When there is any failure at the intended anycast server, all the transient packets can be optimally forwarded to another App Server attached to a different egress router. Further, this approach may not need the ingress nodes to establish tunnels with egress routers.

There may be also certain limitations of using IGP. For example, the IGP approach might not suit well to a 5G EC LDN operated by multiple Internet Service Providers (ISPs) networks. For an LDN operated by multiple IPSs, BGP may be a better choice. An Application Metadata (AppMetaData) NLRI Path Attribute can be used in a BGP UPDATE message to propagate IP Layer App-Metrics crossing multiple ISPs.

An aggregated cost can be computed by the egress routers. If all egress routers that have a direct connection to the App Servers can get a periodic update of the aggregated cost to the App Servers or can be configured with a consistent algorithm to compute an aggregated cost that takes into consideration the Load Measurement, Capacity value, and Preference value. This aggregated cost can be considered as the Metric of the link to the App Server. For example, an OSPFv3 LSA can be employed to carry the aggregated cost. If the App Servers use an IPv6 anycast address, the aggregated cost computed by the egress routers can be encoded in the Metric field of an Intra-Area-Prefix-LSA. An OSPFv2 LSA can also be employed to carry the aggregated cost. For App Servers with IPv4 addresses, the aggregated cost can be encoded in the Metric field of a Stub Link LSA.

IP Layer App-Metrics Advertisements are discussed. For example, OSPF extensions can carry the detailed IP Layer Metrics when it is not possible for all the egress routers to have a consistent algorithm to compute the aggregated cost or some routers need all the detailed IP Layer metrics for the App Servers for other purposes. Since only a subset of routers within an IGP domain need to know those detailed metrics, it may make sense to use an OSPFv2 Extended Prefix Opaque LSA for IPv4 and/or an OSPFv3 Extended LSA with an Intra-Area-Prefix TLV to carry the detailed sub-TLVs. In this case, routers that do not employ such metrics can ignore such messages. It's worth noting that not all hosts attached to an A-ER are anycast servers that need network optimization. An A-ER may only advertise the App-Metrics for the anycast addresses that match with the configured ACLs.

The Stub-Link TLV can be used for OSPFv2/v3 protocol and the Intermediate System to Intermediate System (ISIS) protocol. Considering the interfaces on an edge router that connects to the App Servers are normally configured as passive interfaces, these IP-layer App-metrics can also be advertised as the attributes of the passive/stub link. The associated prefixes can then be advertised in a Stub-Link Prefix Sub-TLV. All the associated prefixes share the same characteristic of the link. Other link related sub-TLVs can also be attached and applied to the calculation of path to the associated prefixes. An OSPFv3 Extended LSA with the Intra-Area-Prefix Address TLV as shown in FIG. 2 and/or FIG. 3 can be used to carry the App-Metrics for the attached App Servers using IPv6. For App Servers using IPv4 addresses, the OSPFv2 Extended Prefix Opaque LSA with the extended Prefix TLV as shown in FIG. 4 can be used to carry the App Metrics sub-TLVs in order to advertise the IP Layer App-Metrics.

Various IP Layer App-Metrics Sub-TLVs are discussed. Two example types of Load Measurement Sub-TLVs are specified in this section. An Aggregated Load Index can be based on a weighted combination of the collected measurements. Further, the raw measurements of packets/bytes to/from the App Server address can also be used. The raw measurement is useful when the egress routers cannot be configured with a consistent algorithm to compute the aggregated load index or the raw measurements are used by a central analytic system.

For example, the BGP Aggregated Load Index Sub-TLV as shown in FIG. 9 can be employed. The Type field indicates that the sub-TLV carries the Aggregated Load Measurement Index derived from the Weighted combination of bytes/packets sent to/received from the App Server according to: Index=w1*ToPackets+w2*FromPackets+w3*ToBytes+w4*FromBytes. Where each w is a weighting factor with a value between 0 and 1 such that w1+w2+w3+w4=1.

In another example, a BGP Raw Load Measurement Sub-TLV as shown in FIG. 6 can be employed. The Type field indicates that the sub-TLV carries the raw measurements of packets/bytes to/from the App Server anycast address. The Measurement Period field may contain a user-specified period in seconds with a default of 3600 seconds. The Capacity Index and Site preference can be stable for each site. If those values are configured to nodes, they might not be included in every OSPF LSA.

Figure 10:
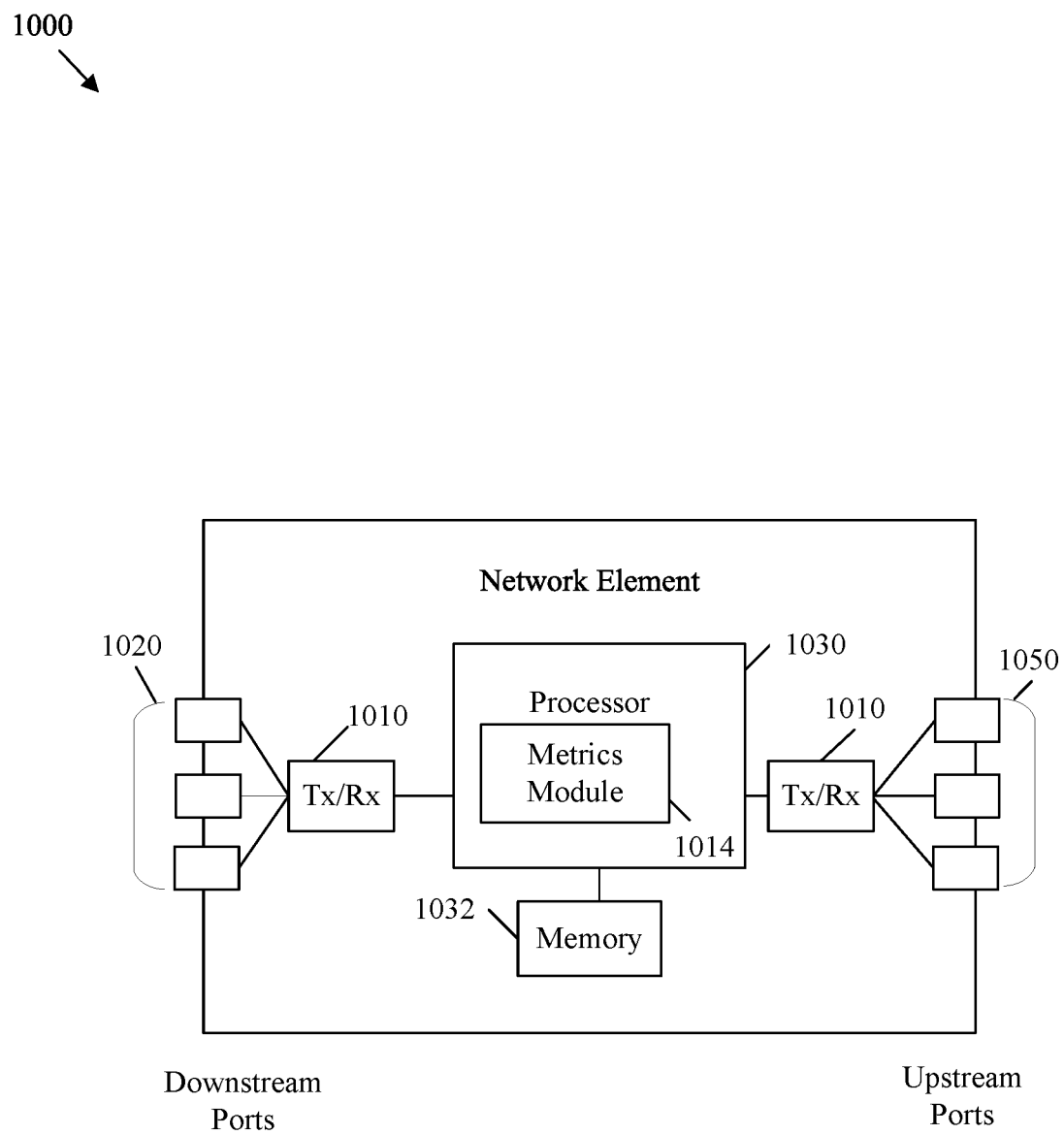
FIG. 10 is a schematic diagram of an example network element for employing anycast routing cost information to support load balanced anycast routing in a 5G edge computing network.

FIG. 10 is a schematic diagram of an example network element 1000 for employing anycast routing cost information to support load balanced anycast routing in a 5G edge computing network, such as an ingress router 113, an egress router 131, 134, and/or 137, and/or a route reflector 121 in a 5G edge computing network 100. For example, the network element 1000 can be employed to implement method 1100 and/or 1200 by employing an OSPFv3 LSA 200, an OSPFv3 LSA 300, an OSPFv2 LSA 400, a BGP NLRI path attribute 500, a BGP raw load measurement sub-TLV 600, a BGP capacity index sub-TLV 700, a BGP preference index sub-TLV 800, and/or a BGP aggregated load index sub-TLV 900. Hence, the network element 1000 is suitable for implementing the disclosed examples/embodiments as described herein. The network element 1000 comprises downstream ports 1020, upstream ports 1050, and/or one or more transceiver units (Tx/Rx) 1010, including transmitters and/or receivers for communicating data upstream and/or downstream over a network. The network element 1000 also includes a processor 1030 including a logic unit and/or central processing unit (CPU) to process the data and a memory 1032 for storing the data. The network element 1000 may also comprise optical-to-electrical (OE) components, electrical-to-optical (EO) components, and/or wireless communication components coupled to the upstream ports 1050 and/or downstream ports 1020 for communication of data via electrical, optical, and/or wireless communication networks.

The processor 1030 is implemented by hardware and software. The processor 1030 may be implemented as one or more CPU chips, cores (e.g., as a multi-core processor), field-programmable gate arrays (FPGAs), application specific integrated circuits (ASICs), digital signal processors (DSPs), or any combination of the foregoing. The processor 1030 is in communication with the downstream ports 1020, Tx/Rx 1010, upstream ports 1050, and memory 1032. The processor 1030 comprises a metrics module 1014. The metrics module 1014 may implement one or more of the disclosed embodiments described herein.

In an example, the metrics module 1014 can operate on an egress router. In such an example, the metrics module 1014 can determine a capacity index, a load index, and/or a preference index for an attached application server employing an anycast address. The metrics module 1014 can then transmit the capacity index, a load index, and/or a preference index over the network using BGP, OSPF, and/or ISIS to support load balanced anycast routing. In another example, the metrics module 1014 can operate at an ingress router. In such a case, the metrics module 1014 can receive a capacity index, a load index, and/or a preference index from an egress router, where the capacity index, a load index, and/or a preference index describe a routing cost at an application server attached to the egress router and addressed via an anycast address. The metrics module 1014 can then determine routing costs to a plurality of application servers that share the same anycast address and select an application server for anycast traffic based on the routing costs. Accordingly, the metrics module 1014 may be configured to perform mechanisms to address one or more of the problems discussed above. As such, the metrics module 1014 improves the functionality of the network element 1000 as well as addresses problems that are specific to the telecommunication arts. Further, the metrics module 1014 effects a transformation of the network element 1000 to a different state. Alternatively, the metrics module 1014 can be implemented as instructions stored in the memory 1032 and executed by the processor 1030 (e.g., as a computer program product stored on a non-transitory medium).

The memory 1032 comprises one or more memory types such as disks, tape drives, solid-state drives, read only memory (ROM), random access memory (RAM), flash memory, ternary content-addressable memory (TCAM), static random-access memory (SRAM), and other optical and/or electrical memory systems suitable for this task. The memory 1032 may be used as an over-flow data storage device, to store programs when such programs are selected for execution, and to store instructions and data that are read during program execution.

Figure 11:
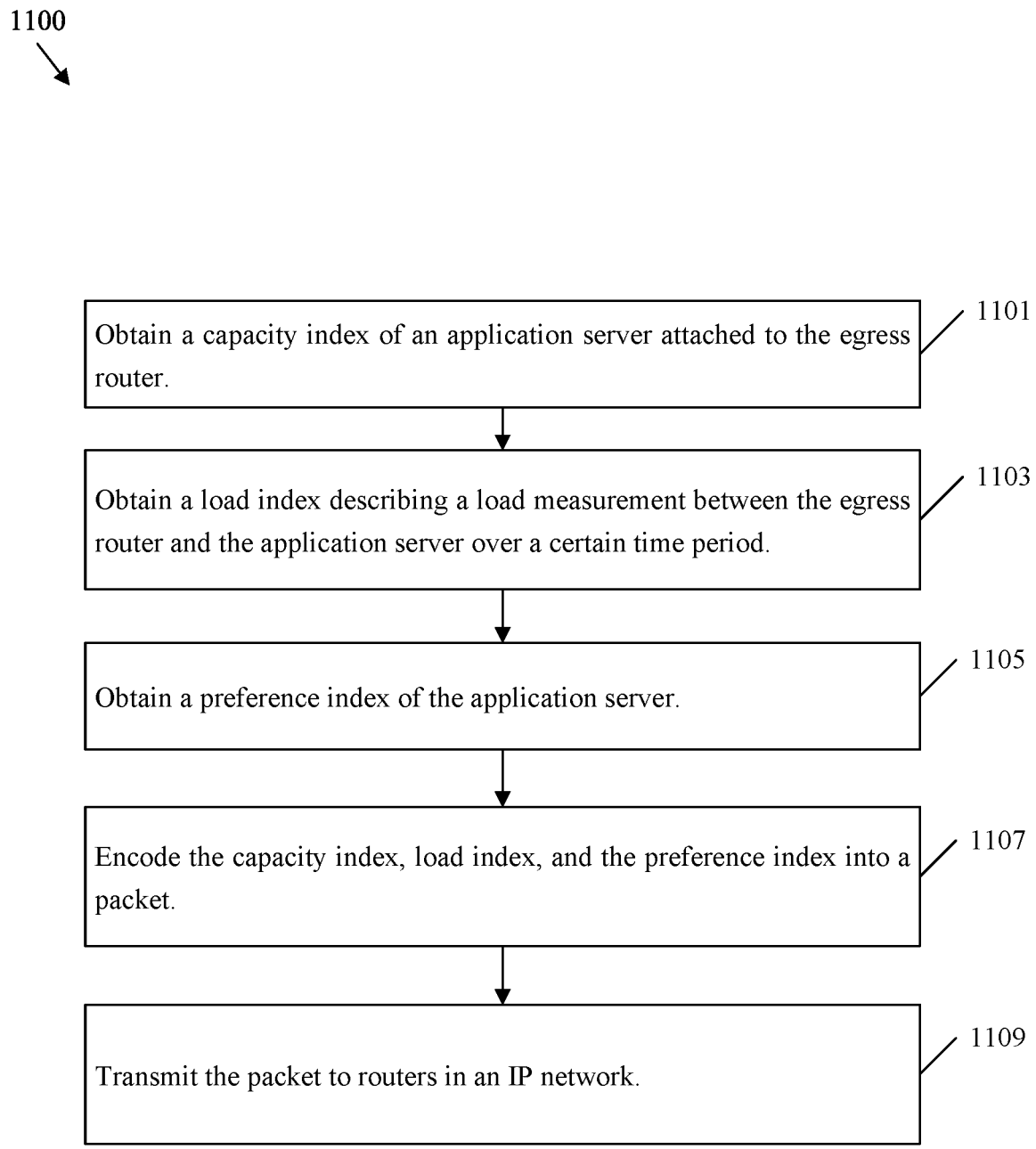
FIG. 11 is a flowchart of an example method of communicating anycast routing cost information from an egress router to support load balanced anycast routing in a 5G edge computing network.

FIG. 11 is a flowchart of an example method 1100 of communicating anycast routing cost information from an egress router to support load balanced anycast routing in a 5G edge computing network. The method 1100 may be employed by a egress router, such as egress router 131, 134, and/or 137 and/or a network element 1000, to communicate routing costs for an attached application server, such as application server 133, 136, and/or 139, respectively. The method 1100 may communicate the routing costs data via BGP, OSPF, and/or ISIS by employing, for example, an OSPFv3 LSA 200, an OSPFv3 LSA 300, an OSPFv2 LSA 400, a BGP NLRI path attribute 500, a BGP raw load measurement sub-TLV 600, a BGP capacity index sub-TLV 700, a BGP preference index sub-TLV 800, and/or a BGP aggregated load index sub-TLV 900. Method 1100 may begin when an egress router determines to advertise routing cost data for an attached application server.

At step 1101, the egress router obtains a capacity index of an application server attached to the egress router. For example, the capacity index indicates a capacity of the application server, which may be a numerical value indicating a number of packets the application server can process over the certain time period. The certain time period may be a measurement period, a specified period, or an LSA advertisement period. The capacity index can be configured into the egress router by a system administrator. Accordingly, the capacity index can be obtained from a memory of the egress router.

At step 1103, the egress router obtains a load index describing a load measurement of a number of packets communicated between the egress router and the application server over a certain time period. The certain time period may be a measurement period, a specified period or an LSA advertisement period. The egress router can obtain the load index by measuring packets traversing the egress router over the fixed time period. For example, the egress router can determine packets and/or bytes sent to the application server and packets and/or bytes received from the application server over a measurement period. The measurement period may be a default value or may be configured by a system administrator in the egress router.

At step 1105, the egress router obtains a preference index of the application server. The preference index contains a value that indicates a preference for the application server relative to other application servers sharing an anycast address. In an example, the preference index can be configured into the egress router by a system administrator. For example, each application server can be assigned a preference index between zero and one, with higher values (e.g., above 0.5) indicating a preferred application server and lower values (e.g., below 0.5) indicating a non-preferred application server. As a specific example, the preference index may include a preference value for the attached application server and a preference value for a reference application server that shares the same anycast address as the attached application server.

At step 1107, the egress router encodes the capacity index, the load index, and the preference index into a packet. In some embodiments, the capacity index, the load index, and the preference index are encoded into the packet as separate metrics, for example an AppMetadata metric or an IP Layer App-Metric. In another embodiment, the load index can be encoded as raw measurement data. In some embodiments, the capacity index, the load index, and the preference index are encoded into the packet as an aggregated cost computed based on the capacity index, the load index, and the preference index. For example, encoding the capacity index, the load index, and the preference index can include computing a cost to an application server based on the capacity index, the load index, and the preference index and then encoding the cost into the packet. The cost to the application server is an application information (e.g. AppMetaData) constrained metric for path selection. In an embodiment, the load index, capacity index, and preference index can be incorporated into the cost to an application server computed according to formula (3) described in this disclosure.

At step 1109, the egress router transmits the packet to routers in an IP network. For example, the packet may be an OSPF LSA, such as OSPFv3 LSA 200, OSPFv3 LSA 300, and/or OSPFv2 LSA 400. In this embodiment, transmitting the packet includes broadcasting the OSPF LSA to routers attached to the IP network, including an ingress router, according to an OSPF protocol. In another embodiment, the packet may be an ISIS link state packet data unit (LSP). In this embodiment, transmitting the packet includes broadcasting the ISIS LSP to routers attached to the IP network, including an ingress router, according to an ISIS protocol. In another embodiment, the packet may be a BGP update message. In this embodiment, transmitting the packet includes transmitting the BGP update message to a route reflector for distribution to a group of edge routers connected to the IP network, including an ingress router. The BGP update message can include a BGP NLRI path attribute 500, a BGP raw load measurement sub-TLV 600, a BGP capacity index sub-TLV 700, a BGP preference index sub-TLV 800, and/or a BGP aggregated load index sub-TLV 900.

Figure 12:
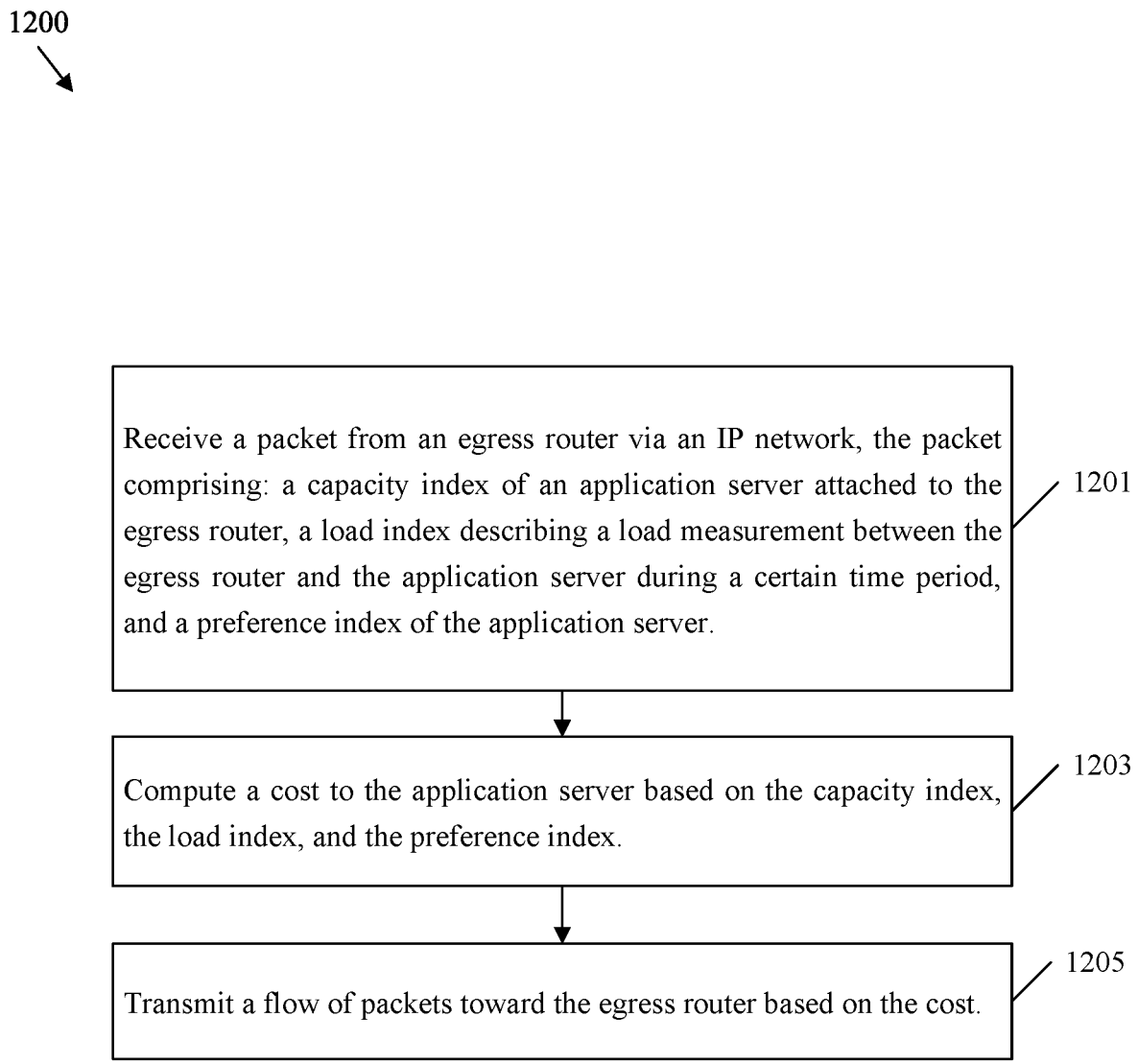
FIG. 12 is a flowchart of an example method of employing anycast routing cost information at an ingress router to perform load balanced anycast routing in a 5G edge computing network.

FIG. 12 is a flowchart of an example method 1200 of employing anycast routing cost information at an ingress router to perform load balanced anycast routing in a 5G edge computing network. The method 1200 may be employed by an ingress router, such as ingress router 113 and/or a network element 1000, to receive and route anycast traffic based on routing costs to an application server, such as application server 133, 136, and/or 139. The method 1200 may receive the routing costs data via BGP, OSPF, and/or ISIS by employing, for example, an OSPFv3 LSA 200, an OSPFv3 LSA 300, an OSPFv2 LSA 400, a BGP NLRI path attribute 500, a BGP raw load measurement sub-TLV 600, a BGP capacity index sub-TLV 700, a BGP preference index sub-TLV 800, and/or a BGP aggregated load index sub-TLV 900. Method 1200 may begin when an ingress router receives routing cost data for an anycast application server via BGP, OSPF, and/or ISIS. For example, method 1200 may be performed in response to method 1100.

At step 1201, the ingress receives a packet from an egress router via an IP network. The packet comprises a capacity index of an application server attached to the egress router. The capacity index may be a numerical value indicating a number of packets the application server can process over the fixed time period. The packet also comprises a load index describing a number of packets communicated between the egress router and the application server over a fixed time period. The load index indicates a measurement of a number of packets traversing the egress router over the fixed time period. The packet also comprises a preference index of the application server. The preference index contains a value that indicates a preference for the application server relative to other application servers sharing an anycast address. In some examples, the capacity index, the load index, and the preference index are encoded into the packet as separate metrics. In another example, the load index can be encoded as raw measurement data. In some embodiments, the capacity index, the load index, and the preference index are taken consideration to compute an aggregated cost and then the aggregated cost is inserted into the packet.

In an example, the packet may be an OSPF LSA, such as OSPFv3 LSA 200, OSPFv3 LSA 300, and/or OSPFv2 LSA 400. In this example, the packet is received as part of a broadcast of the OSPF LSA to routers attached to the IP network according to an OSPF protocol. In another example, the packet may be an ISIS LSP. In this example, the packet is received as part of a broadcast of the ISIS LSP to routers attached to the IP network according to an ISIS protocol. In another example, the packet may be a BGP update message. In this example, the packet is received from a route reflector as part of a distribution to a group of edge routers connected to the IP network. The BGP update message can include a BGP NLRI path attribute 500, a BGP raw load measurement sub-TLV 600, a BGP capacity index sub-TLV 700, a BGP preference index sub-TLV 800, and/or a BGP aggregated load index sub-TLV 900.

At step 1203, the ingress router computes a cost to an application server based on the capacity index, the load index, the preference index, and a network delay between the ingress router and the egress router. For example, the network delay can be determined by a RTT between the ingress router and the egress router and used in the computation of the cost. In an example, the cost can be computed according to the formula (3) described in this disclosure.

At step 1205, the ingress router can select the application server attached to the egress router from a group of application servers sharing the same anycast address based on the cost computed at step 1203. The ingress router can then transmit a flow of packets toward the application server and the egress router.

Figure 13:
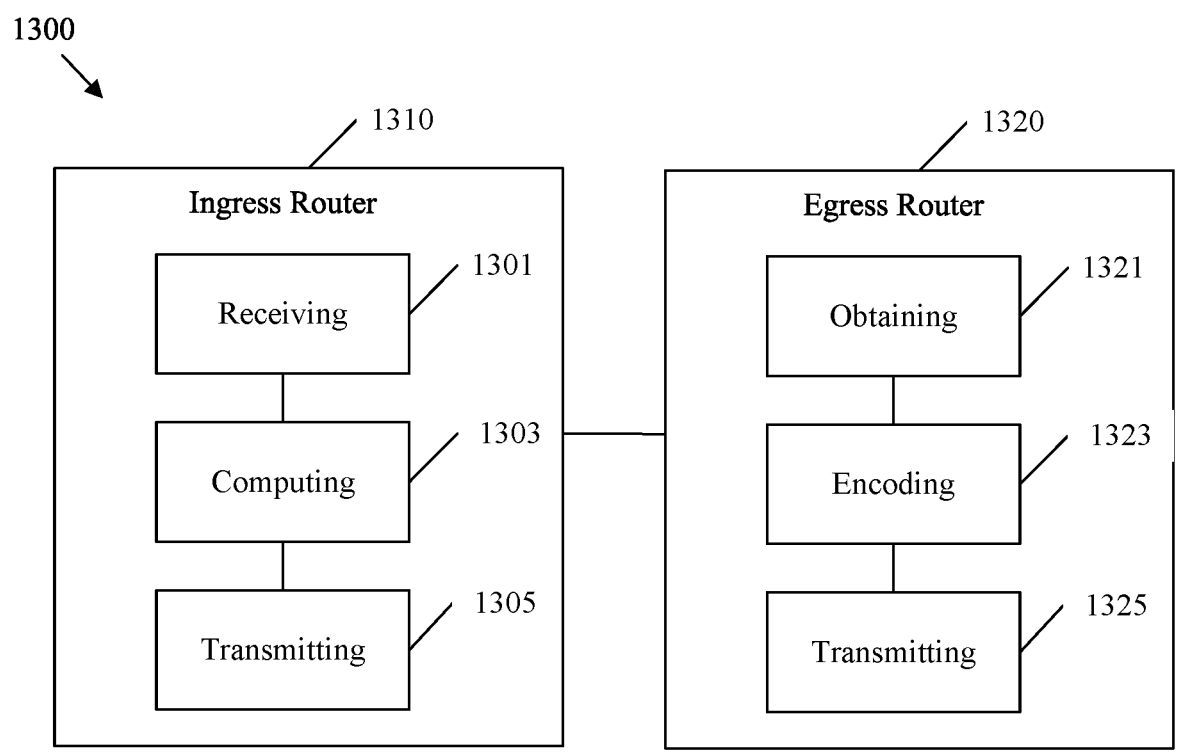
FIG. 13 is a schematic diagram of an example 5G edge computing system for employing anycast routing cost information to support load balanced anycast routing in a 5G edge computing network.

FIG. 13 is a schematic diagram of an example 5G edge computing system 1300 for employing anycast routing cost information to support load balanced anycast routing in a 5G edge computing network. For example, the 5G edge computing system 1300 may be implemented by corresponding components in a 5G edge computing network 100 and/or by a network element 1000. In an example, the 5G edge computing system 1300 may employ method 1100 and/or 1200, for example by employing an OSPFv3 LSA 200, an OSPFv3 LSA 300, an OSPFv2 LSA 400, a BGP NLRI path attribute 500, a BGP raw load measurement sub-TLV 600, a BGP capacity index sub-TLV 700, a BGP preference index sub-TLV 800, and/or a BGP aggregated load index sub-TLV 900.

The 5G edge computing system 1300 comprises an ingress router 1310. The ingress router 1310 comprises a receiving module 1301 for receiving a packet from an egress router via an IP network where the packet comprises a capacity index of an application server attached to the egress router and a load index describing a number of packets communicated between the egress router and the application server over a fixed time period. The ingress router 1310 further comprises a computing module 1303 for computing a load measurement constrained shortest path first metric based on the capacity index and the load index. The ingress router 1310 further comprises a transmitting module 1305 for transmitting a flow of packets toward the egress router based on the load measurement constrained shortest path first metric. The components of the ingress router 1310 may be further configured to perform any of the steps of method 1200.

The 5G edge computing system 1300 also comprises an egress router 1320. The egress router 1320 comprises an obtaining module 1321 for obtaining a capacity index of an application server attached to the egress router. The obtaining module 1321 is also for obtaining a load index describing a number of packets communicated between the egress router and the application server over a fixed time period. The egress router 1320 further comprises an encoding module 1323 for encoding the capacity index and load index into a packet. The egress router 1320 further comprises a transmitting module 1325 for transmitting the packet to routers in an IP network. The components of the egress router 1320 may be further configured to perform any of the steps of method 1100.

A first component is directly coupled to a second component when there are no intervening components, except for a line, a trace, or another medium between the first component and the second component. The first component is indirectly coupled to the second component when there are intervening components other than a line, a trace, or another medium between the first component and the second component. The term "coupled" and its variants include both directly coupled and indirectly coupled. The use of the term "about" means a range including ±10% of the subsequent number unless otherwise stated.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A method implemented by an egress router, the method comprising:
   obtaining a capacity index of an application server attached to the egress router;
   obtaining a load index describing a load measurement between the egress router and the application server during a certain time period;
   encoding a cost to the application server for anycast traffic into a packet, wherein the cost is computed based on the capacity index and the load index; and
   transmitting the packet to one or more routers in an Internet protocol (IP) network.

2. The method of claim 1, further comprising:
   obtaining a preference index of the application server, wherein the preference index contains a value that indicates a preference for the application server relative to other application servers sharing an anycast address; and
   encoding the preference index into the packet.

3. The method of claim 1, wherein the capacity index is a numerical value indicating a number of packets the application server can process during the certain time period.

4. The method of claim 1, wherein the load index is obtained by measuring packets traversing the egress router during the certain time period.

5. The method of claim 1, wherein the packet is an open shortest path first (OSPF) link state advertisement (LSA), and wherein transmitting the packet includes broadcasting the OSPF LSA to routers attached to the IP network according to an OSPF protocol.

6. The method of claim 1, wherein the packet is an intermediate system to intermediate system (ISIS) link state packet (LSP) data unit, and wherein transmitting the packet includes broadcasting the ISIS LSP data unit to routers attached to the IP network according to an ISIS protocol.

7. The method of claim 1, wherein the packet is a border gateway protocol (BGP) update message.

8. The method of claim 7, wherein transmitting the packet includes transmitting the BGP update message to a route reflector for distribution to a group of edge routers connected to the IP network.

9. The method of claim 2, wherein the cost to the application server for anycast traffic is based on the capacity index, the load index, and the preference index, wherein the cost to the application server is computed according to:

$$\frac{\alpha L_j \beta_i}{L_i \beta_j} + \frac{(1-\alpha) D_j \gamma_i}{D_i \gamma_j}$$

where $L_i$ represents a load measurement for the site i, $L_j$ represents a load measurement for the site j, $\beta_i$ represents a capacity of an application server at the site i, $\beta_j$ represents a capacity of an application server at the site j, $D_i$ represents a network latency between a first ingress router and a first egress router attached to the application server at the site i, $D_j$ represents a network latency between a second ingress router and a second egress router attached to the application server at the site j, $\gamma_i$ represents a network preference for the site i, $\gamma_j$ represents a network preference for the site j, $\alpha$ represents a weighting factor for load and site information.

10. A method implemented by an ingress router, the method comprising:
    receiving a packet from an egress router via an Internet protocol (IP) network, the packet comprising:
    a capacity index of an application server attached to the egress router; and
    a load index describing a load measurement between the egress router and the application server during a certain time period;
    computing a cost to the application server based on the capacity index and the load index; and
    transmitting a flow of packets toward the egress router based on the cost.

11. The method of claim 10, wherein the packet further comprises a preference index of the application server, wherein the preference index contains a value that indicates a preference for the application server relative to other application servers sharing an anycast address, and wherein the cost is further computed based on the preference index.

12. The method of claim 10, wherein the capacity index is a numerical value indicating a number of packets the application server can process during the certain time period.

13. The method of claim 10, wherein the packet is an open shortest path first (OSPF) link state advertisement (LSA), and wherein the packet is received as part of a broadcast of the OSPF LSA to routers attached to the IP network according to an OSPF protocol.

14. The method of claim 10, wherein the packet is an intermediate system to intermediate system (ISIS) link state packet data unit (LSP), and wherein the packet is received as part of a broadcast of the ISIS LSP to routers attached to the IP network according to an ISIS protocol.

15. The method of claim 10, wherein the packet is a border gateway protocol (BGP) update message.

16. The method of claim 15, wherein the packet is received from a route reflector as part of a distribution to a group of edge routers connected to the IP network.

17. The method of claim 10, wherein the cost to the application server is computed according to:

$$\frac{\alpha L_j \beta_i}{L_i \beta_j} + \frac{(1-\alpha) D_j \gamma_i}{D_i \gamma_j}$$

where $L_i$ represents a load measurement for the site i, $L_j$ represents a load measurement for the site j, $\beta_i$ represents a capacity of an application server at the site i, $\beta_j$ represents a capacity of an application server at the site j, $D_i$ represents a network latency between a first ingress router and a first egress router attached to the application server at the site i, $D_j$ represents a network latency between a second ingress router and a second egress router attached to the application server at the site j, $\gamma_i$ represents a network preference for the site i, $\gamma_j$ represents a network preference for the site j, $\alpha$ represents a weighting factor for load and site information.

18. An egress router, comprising:
    a memory configured to store instructions; and
    one or more processors configured to execute the instructions to cause the egress router to:
    obtain a capacity index of an application server attached to the egress router;

obtain a load index describing a load measurement between the egress router and the application server during a certain time period;

encode a cost to the application server for anycast traffic into a packet, wherein the cost is computed based on the capacity index and the load index; and transmit the packet to one or more routers in an Internet protocol (IP) network.

19. The egress router of claim 18, wherein the one or more processors are further configured to execute the instructions to cause the egress router to:

obtain a preference index of the application server, wherein the preference index contains a value that indicates a preference for the application server relative to other application servers sharing an anycast address; and encode the preference index into the packet.

20. An ingress router, comprising:

a memory configured to store instructions; and one or more processors configured to execute the instructions to cause the ingress router to:

receive a packet from an egress router via an Internet protocol (IP) network, the packet comprising:

a capacity index of an application server attached to the egress router; and a load index describing a load measurement between the egress router and the application server during a certain time period;

compute a cost to the application server based on the capacity index and the load index; and transmit a flow of packets toward the egress router based on the cost.

21. The ingress router of claim 20, wherein the packet further comprises a preference index of the application server, wherein the preference index contains a value that indicates a preference for the application server relative to other application servers sharing an anycast address, and wherein the cost is further computed based on the preference index.

* * * * *

UNITED STATES PATENT AND TRADEMARK OFFICE
CERTIFICATE OF CORRECTION

PATENT NO. : 12,219,005 B2  
APPLICATION NO. : 18/303747  
DATED : February 4, 2025  
INVENTOR(S) : Linda Dunbar et al.

Page 1 of 1

It is certified that error appears in the above-identified patent and that said Letters Patent is hereby corrected as shown below:

In the Claims

Column 29, Claim 9, Lines 49-67, through Column 30, Lines 1-3, should read:
9. The method of claim 2, wherein the cost to the application server for anycast traffic is based on the capacity index, the load index, and the preference index, wherein the cost to the application server is computed according to:

$$\frac{\alpha L_j \beta_i}{L_i \beta_j} + \frac{(1-\alpha) D_j \gamma_i}{D_i \gamma_j}$$

where $L_i$ represents a load measurement for the site i, $L_j$ represents a load measurement for the site j, $\beta_i$ represents a capacity of an application server at the site i, $\beta_j$ represents a capacity of an application server at the site j, $D_i$ represents a network latency between a first ingress router and a first egress router attached to the application server at the site i, $D_j$ represents a network latency between a second ingress router and a second egress router attached to the application server at the site j, $\gamma_i$ represents a network preference for the site i, $\gamma_j$ represents a network preference for the site j, α represents a weighting factor for load and site information.

Signed and Sealed this  
Eighteenth Day of March, 2025

Coke Morgan Stewart  
*Acting Director of the United States Patent and Trademark Office*